(12) United States Patent
Manneschi

(10) Patent No.: US 12,313,807 B2
(45) Date of Patent: May 27, 2025

(54) METAL-DETECTOR MEANS FOR LOCATING THE PRESENCE OF METAL OBJECTS

(71) Applicant: Alessandro Manneschi, Arezzo (IT)

(72) Inventor: Alessandro Manneschi, Arezzo (IT)

(\*) Notice: Subject to any disclaimer, the term of this patent is extended or adjusted under 35 U.S.C. 154(b) by 453 days.

(21) Appl. No.: 17/426,498

(22) PCT Filed: Jan. 29, 2020

(86) PCT No.: PCT/EP2020/052188
§ 371 (c)(1),
(2) Date: Jul. 28, 2021

(87) PCT Pub. No.: WO2020/157147
PCT Pub. Date: Aug. 6, 2020

(65) Prior Publication Data
US 2022/0107439 A1    Apr. 7, 2022

(30) Foreign Application Priority Data
Jan. 29, 2019 (FR) ...................................... 1900766

(51) Int. Cl.
*G01V 3/10* (2006.01)
*G01V 3/12* (2006.01)
*G01V 3/36* (2006.01)
*G01V 3/38* (2006.01)

(52) U.S. Cl.
CPC ................ *G01V 3/104* (2013.01); *G01V 3/12* (2013.01); *G01V 3/36* (2013.01); *G01V 3/38* (2013.01)

(58) Field of Classification Search
CPC . G01V 3/104; G01V 3/12; G01V 3/36; G01V 3/38; G01V 3/08; G01V 3/10–107; G01V 8/005; G01V 11/00; G01S 13/86; G01S 13/887

USPC ........ 324/326, 327, 329, 228, 234, 236, 239, 324/243, 244, 207.15, 233, 232
See application file for complete search history.

(56) References Cited

U.S. PATENT DOCUMENTS

| 4,012,690 A | 3/1977 | Heytow |
| 5,406,259 A | 4/1995 | Manneschi |
| 6,239,423 B1 | 5/2001 | Hama et al. |

(Continued)

FOREIGN PATENT DOCUMENTS

| CN | 1864079 A | 11/2006 |
| EP | 1750148 A1 | 2/2007 |

(Continued)

OTHER PUBLICATIONS

International Search Report for PCT/EP2020/052188 mailed Apr. 1, 2020. 4 pages.

*Primary Examiner* — Paresh Patel
*Assistant Examiner* — Rahul Maini
(74) *Attorney, Agent, or Firm* — Lerner David LLP

(57) ABSTRACT

A system for detecting forbidden objects worn or carried by individuals includes a metal detector having at least three transducers arranged on either side of a passage, two of these transducers being positioned on the one same side of the passage and spaced apart longitudinally in the direction of travel through the passage, while the third transducer is positioned on the opposite side of the passage so that the three transducers are available in combination to perform spatial discrimination of the location of the metallic objects detected.

20 Claims, 29 Drawing Sheets

(56) References Cited

U.S. PATENT DOCUMENTS

| | | | | |
|---|---|---|---|---|
| 7,432,846 B2* | 10/2008 | Martin | ................ | G01V 8/005 |
| | | | | 342/22 |
| 7,592,907 B2* | 9/2009 | Manneschi | ............ | G01V 3/104 |
| | | | | 324/232 |
| 8,473,240 B2* | 6/2013 | Manneschi | ............. | G01T 1/163 |
| | | | | 702/150 |
| 10,134,254 B2* | 11/2018 | Jarvi | ........................ | G01V 8/10 |
| 11,630,230 B2* | 4/2023 | Monnier | ................ | G01V 3/15 |
| | | | | 348/77 |
| 2008/0191925 A1 | 8/2008 | Martin et al. | | |
| 2012/0105267 A1* | 5/2012 | DeLia | .................... | G06V 10/36 |
| | | | | 378/70 |

FOREIGN PATENT DOCUMENTS

| | | |
|---|---|---|
| EP | 1750149 A2 | 2/2007 |
| EP | 1798570 A2 | 6/2007 |
| EP | 2202700 A1 | 6/2010 |
| JP | 2001296371 A | 10/2001 |
| WO | 2018225028 A2 | 12/2018 |

* cited by examiner

METAL-DETECTOR MEANS FOR LOCATING THE PRESENCE OF METAL OBJECTS

CROSS-REFERENCE TO RELATED APPLICATIONS

The present application is a national phase entry under 35 U.S.C § 371 of International Application No. PCT/EP2020/052188 filed Jan. 29, 2020, which claims priority from French Application No. 1900766 filed Jan. 29, 2019, all of which are hereby incorporated herein by reference.

FIELD OF THE INVENTION

The present invention relates to the field of detectors designed for the detection of unauthorized objects or substances in an access-protected area.

The present invention relates more specifically to the field of the inductive-type metal detectors.

The present invention applies particularly, but not exclusively, to the integration of a metal detector in a body scanner designed to inspect individuals, for example passengers before boarding, at airports, or individuals accessing a public site, for example a sports venue such as a stadium or an auditorium, in order to detect prohibited objects concealed under clothing. Such apparatuses allow in particular avoiding systematic palpation.

TECHNOLOGICAL BACKGROUND

It appears now necessary to monitor with great reliability the attempts to introduce prohibited products, in particular weapons, into a sensitive area or to get them out of it.

The problem thus posed covers a very wide range of situations, which encompasses in particular and without limitation the attempt to introduce prohibited products into a protected area, such as an airport, a store, a school, a train station, a public or private organization, or the attempt to get products out of a defined perimeter, for example in case of theft in a company or on a protected site.

Different types of metal object detectors exit. Generally the metal detectors are inductive-type detectors. They comprise at least one transmitting coil and at least one receiving coil. The transmitting coil is powered by an alternating electric current. The receiving coil is designed to detect the disturbances of this magnetic field due to the presence of a metal object, for example the attenuation of the amplitude of the magnetic field, or the signal phase change, due for example to the eddy currents generated on the metal object.

Different types of body scanners also exist. The oldest body scanners are X-ray body scanners. Newer body scanners use wave technology called millimeter-wave technology.

An example of a body scanner can be found in document EP 2 202 700. This document proposes in particular to provide an additional metal detector at the entrance of a body scanner.

For several years, body scanners have been developed in order to detect weapons, explosives, etc. hidden under clothing of individuals entering a protected area. All of these systems use technologies based on the detection of radiant energies modulated, reflected or emitted by the body of the inspected individuals. The thus used radiant energies comprise x-rays, microwaves, millimeter waves, infrared light, terahertz waves, and ultrasound.

Despite the use of several types of radiant energies and imaging geometries, these body scanners all work to create an electronic image of the individual on which the individual's clothing is transparent. This image is then displayed on a screen and viewed by an operator in order for him to determine whether the individual is carrying a target object. For this, the operator, who is trained to detect target objects, must be able to determine whether the objects identified by the body scanner correspond to human anatomy, to an authorized object such as a lighter, a handkerchief or parts, or to a target object such as a weapon or an explosive.

Nowadays, it turns out that individuals who attempt to fraudulently introduce a prohibited object, in particular a weapon, into a protected area use a great deal of imagination to conceal said objects, for example separate the object into different pieces that they distribute over the body.

The examination using body scanners consequently becomes increasingly complex and long to carry out.

Furthermore, while existing metal detectors are generally satisfactory in detecting the existence or not of a metal object, they are often inadequate in terms of location of such a metal object on an individual.

Document EP 1 750 148 describes a metal detector comprising three or four coils disposed on either side of a passage in order to determine the position of a target object carried laterally and/or centrally by an individual.

Document U.S. Pat. No. 4,012,690 describes a detection system comprising inductive loops parallel to each other and surrounding the door.

Document EP 2 202 700 describes a detection system combining two detection technologies.

Document WO 2018/225028 describes a system comprising a body scanner and a detection device for shoes.

SUMMARY OF THE INVENTION

One objective of the invention is to propose new detection means for improving the detection of target objects capable of being camouflaged on the body of an individual.

Another objective of the invention is to allow locating a metal object detected on an individual.

One objective of the invention is particularly to propose detection means that are effective regardless of where a fraudulent object is attached on the body of an individual.

A secondary objective of the invention is to propose means that allow an examination using body scanners more accurate and faster than with the body scanners known from the state of the art.

These objectives are achieved according to the invention thanks to a system for detecting prohibited objects carried by individuals and a method for detecting associated prohibited objects in accordance with the appended independent claims. Embodiments are the subject of the dependent claims.

It will be noted that, in particular compared to document EP 1 750 148 in the name of the Applicant, the system of the invention allows further improving the determination of the position of a metal object identified by the at least three transducers. Indeed, in the absence of passage detection barriers and based only of the signals coming from at least three transducers, it is not possible to discriminate the position of the metal object in the depth direction (front/back).

Particularly, the detection system comprises a metal detector comprising at least three inductive transducers disposed on either side of a passage, two of these transducers being placed on the same side of the passage being spaced longitudinally along the direction of movement in the passage, while the third transducer is disposed on the opposite side of the passage so that the three transducers allow in combination a spatial discrimination of the location of the detected metal objects.

According to another advantageous characteristic of the invention, the system comprises in combination a body scanner and said metal detector integrated into the body scanner, which metal detector is adapted to control the body scanner by adapting the sensitivity of the body scanner, at least on one area of interest, depending on whether metal objects are detected or not by the metal detector.

According to another advantageous characteristic of the invention, the metal detector comprises three inductive transducers forming a transmitter and two receivers, for example disposed in the form of a transmitter located on a first side of the passage and two associated receivers disposed on the opposite side of the passage.

According to another advantageous characteristic of the invention, the metal detector comprises three inductive transducers forming two transmitters and a receiver, for example disposed in the form of two transmitters located on a first side of the passage and an associated receiver disposed on the opposite side of the passage.

According to another advantageous characteristic of the invention, the metal detector comprises four inductive transducers forming two transmitters and two receivers for example disposed in the form of two transducers located on a first side of the passage and two transducers disposed on the opposite side of the passage.

According to another advantageous characteristic of the invention, the metal detector comprises at least three inductive transducers adapted to discriminate the position of a detected metal object, on the one hand in the width direction of the passage, transversely to the direction of movement, typically on the left or on the right of an individual, and on the other hand in the depth direction, longitudinally parallel to the direction of movement, typically on the front or on the back of an individual.

According to another advantageous characteristic of the present invention, each of the inductive transducers is adapted to work alternately as a transmitter and/or a receiver.

According to another advantageous characteristic of the present invention, each transducer is formed of at least one coil.

According to another advantageous characteristic of the present invention, the metal detector comprises at least one passage detection barrier, for example an optical barrier, associated with the transducers to detect the position of an individual in the passage, relative to the transducers.

According to another advantageous characteristic of the present invention, the metal detector comprises three passage detection barriers, for example three optical barriers, distributed longitudinally along the passage in the metal detector and associated with the transducers to detect the position of an individual in the passage, relative to the transducers.

According to another advantageous characteristic of the present invention, the metal detector comprises inductive transducers which generate main detection lines between two transducers respectively transmitting and receiving transducers, which are for some transverse to the direction of movement in the metal detector and for others inclined obliquely or diagonally relative to this direction of movement in the metal detector, the transverse detection lines being used primarily to detect metal objects carried by an individual on the front and on the back of his body insofar as the front and the back of the body of the individual reaches firstly and respectively leave lastly these lines, while the oblique detection lines are primarily used to detect metal objects carried by an individual on his left side or his right side insofar as the sides of the individual successively cross these lines.

The invention also relates to a method for detecting prohibited objects carried by an individual using the metal detector comprising at least three inductive transducers disposed on either side of a passage, two of these transducers being placed on a same side of the passage being spaced longitudinally along the direction of movement in the passage, while the third transducer is disposed on the opposite side of the passage, characterized in that it comprises the steps of making a detection of metal objects carried by an individual with location, in the three-dimensional space on the individual, of the metal objects detected using the metal detector.

According to another advantageous characteristic, the method of the invention comprises the step of controlling a body scanner by adapting its sensitivity, depending on whether metal objects are detected or not by the associated metal detector, at least on one area of interest corresponding to the location of a metal object by the metal detector.

BRIEF DESCRIPTION OF THE DRAWINGS

Other characteristics, aims and advantages of the present invention will become apparent upon reading the following detailed description, and with regard to the appended drawings given by way of non-limiting examples and in which:

FIG. 5 represents a series of detection sequences made using a variant of the metal detector in accordance with the present invention comprising four transducers, two transmitting transducers and two receiving transducers, during the progression of an individual carrying metal objects on his front, on his back and on his left and right sides, in the channel of the metal detector, more specifically

DETAILED DESCRIPTION OF ONE EMBODIMENT

Figure 1A:
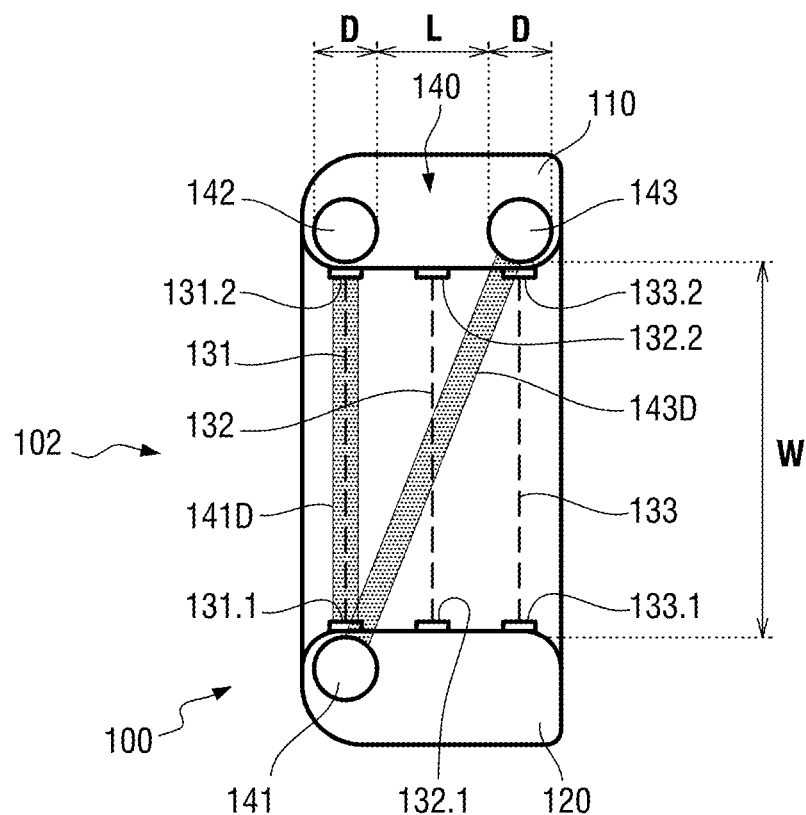
FIGS. 1a, 1b and 1c schematically represent horizontal sectional views of a metal detector in accordance respectively with three alternatives of the invention, FIG. 1d schematically represents a perspective view of a metal detector in accordance with a preferred embodiment of the invention.

In order to improve the detection of target objects capable of being camouflaged on the body of an individual, the invention proposes a system for detecting prohibited objects carried by individuals in accordance with the invention comprising a metal detector 100 comprising transducers 141, 142, 143, at least one passage detection barrier 130 in the metal detector 100 and a central unit 50 which analyzes the signals coming from the passage detection barriers 130 of the transducers 140 to deduce therefrom on which portion of the body of an individual said metal object M1, M2, M3 is placed.

The structure of the metal detectors 100 illustrated in FIGS. 1a, 1b, 1c and 1d is first described.

Figure 1B:
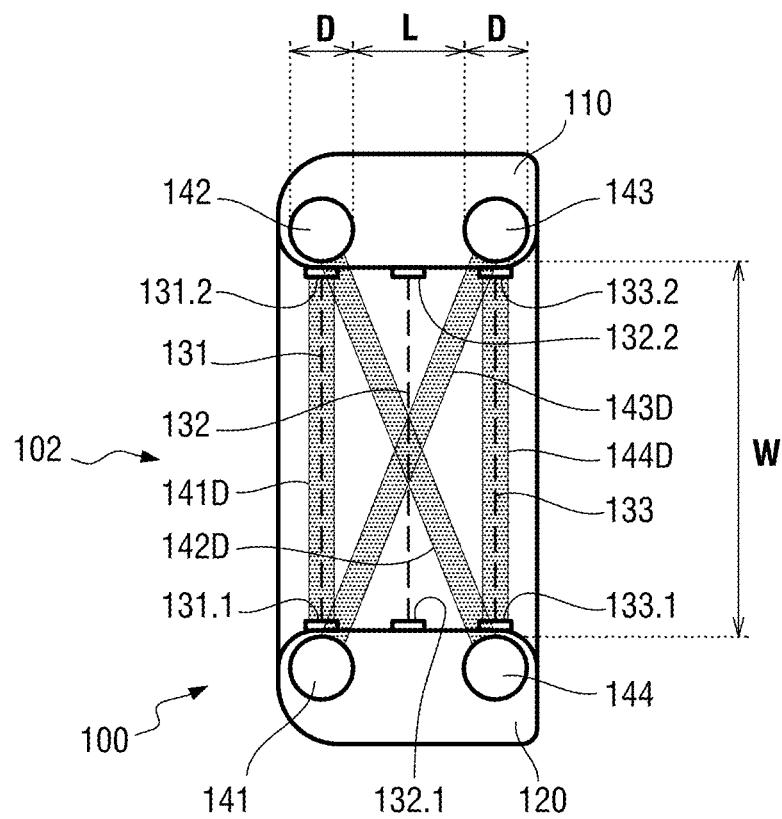
Figure 1C:
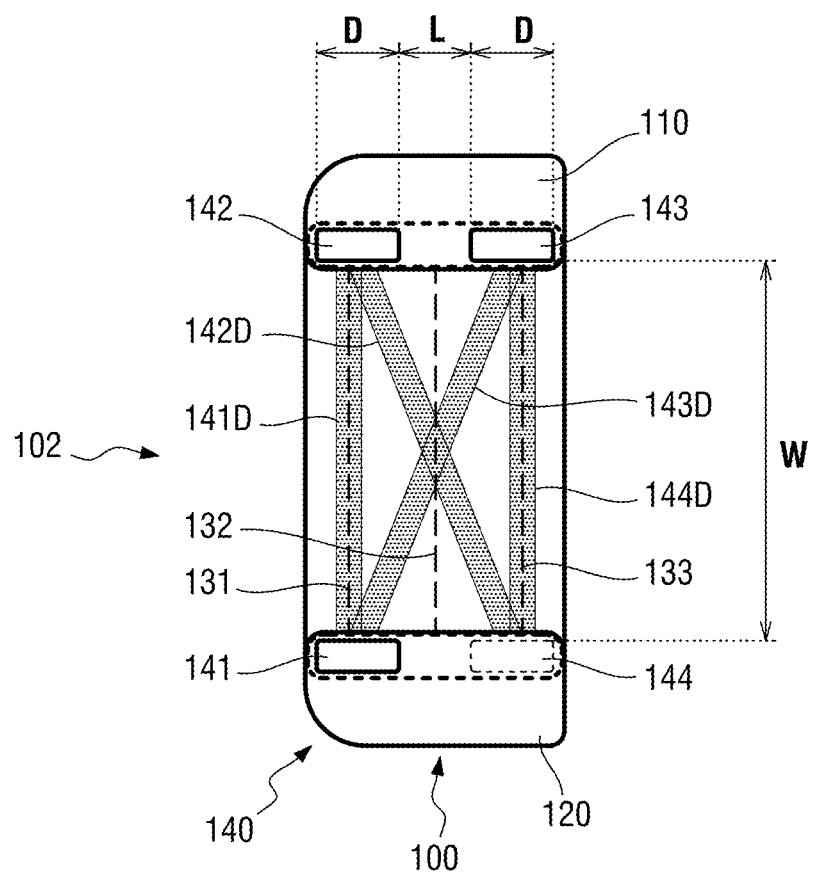
Figure 1D:
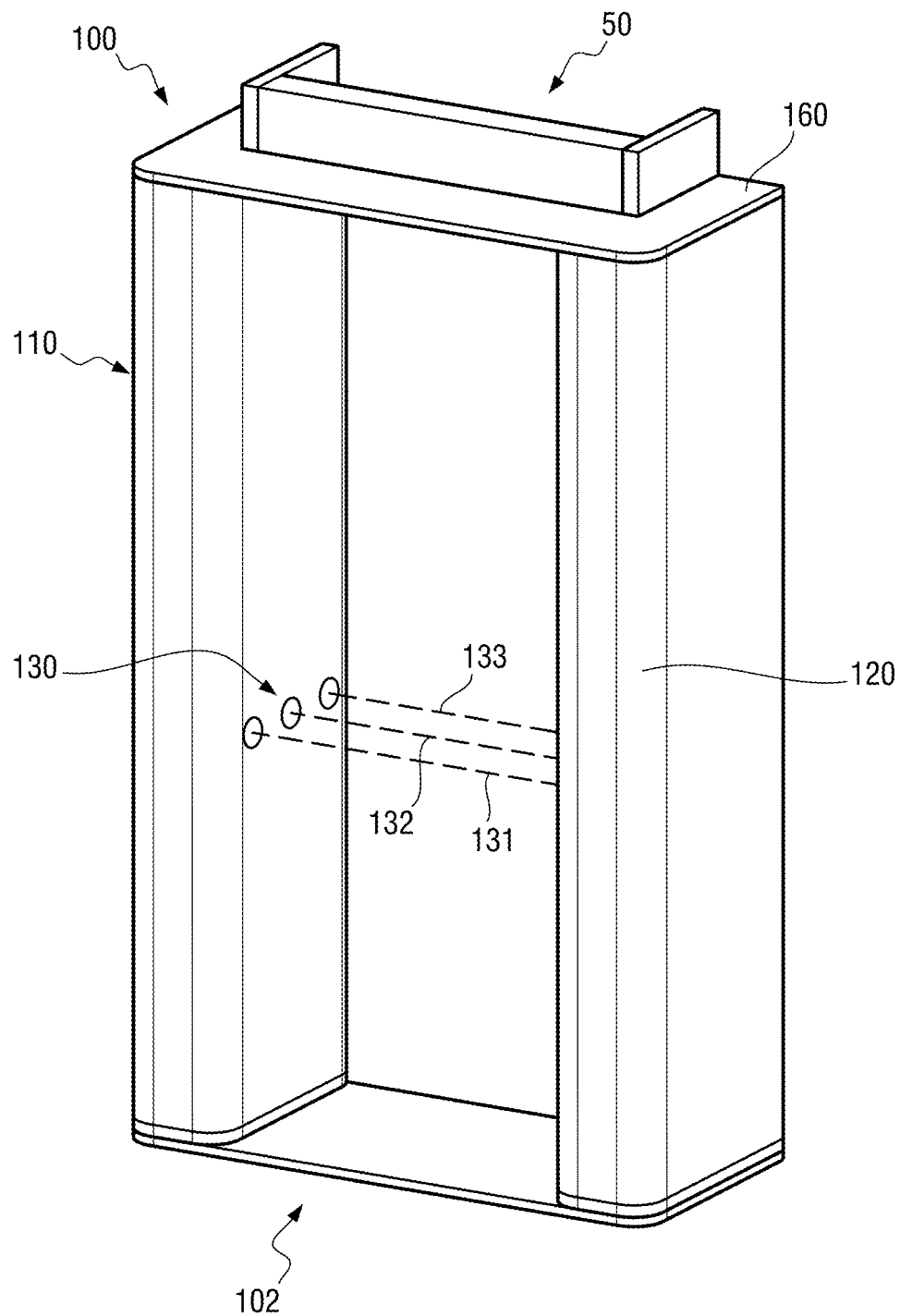

The inductive-type metal detector 100 is preferably formed of a walk-through detector or the same comprising two vertical uprights or panels 110, 120, surmounted by a horizontal bar 160 as illustrated in FIG. 1d.

The central unit 50 can be housed anywhere in the system, for example in the casing of the detector 100, typically at the bar 160. The central unit 50 can in particular comprise a processor, microprocessor, microcontroller-type computer configured to execute instructions.

The metal detector 100 defines a channel or passageway 102 that any individual must take to cross the walk-through detector. This channel or passageway 102 is framed by the two side panels 110, 120.

The side panels 110, 120 house means 140 forming a metal detector. These means 140 are preferably formed of coils placed respectively in the panels 110, 120.

The coil-based metal detector technology is well known to those skilled in the art. It will therefore not be described in detail hereinafter either.

It should be recalled, however, that generally the inductive-type metal detectors comprise at least one transmitting coil placed on one side of the passage 102 and at least one receiving coil placed on the opposite side of the passage 102. The transmitting coil is powered by an alternating electric current of monitored frequency, preferably a range of determined and monitored frequencies, to emit a magnetic field, typically between 100 Hz and 50 kHz. The receiving coil is designed to detect the disturbances of this magnetic field due to the presence of a metal object in the passage 102 and to the movement of this metal object in the passage 102, for example the attenuation of the amplitude of the magnetic field, or the signal phase change, due for example to the eddy currents generated on the metal object.

In practice, each of the transmitting and receiving coils is preferably formed of a plurality of elementary coils or turns, covering a respective part of the height of the walk-through detector, to allow discriminating the position of the metal targets detected and thus locating in height the position of these targets.

Furthermore, each of the coils is preferably alternately a transmitting and a receiving coil.

FIG. 1a represents a first alternative according to which the means 140 are formed of three coil transducers 141, 142, 143 distributed between the side panels 110, 120 in the form of at least one coil 141 in a side panel 120 and two coils 142, 143 in the opposite side panel 110.

The two coils 142 and 143 located in a common side panel 110 or 120 are furthermore spaced longitudinally.

As will be explained subsequently, this configuration allows a metal detection with a three-dimensional location of the metal. This three-dimensional location is made possible by the fact that the individual successively crosses several privileged detection lines which correspond to dummy lines connecting respectively the centers of the transmitting and receiving coils. Thus, if it is arbitrarily considered that the coil 141 located on one side of the detector 100 is a transmitting coil, while the two coils 142 and 143 located on the opposite side of the detector 100 are receiving coils, an individual who moves in the detector 100 successively crosses a first privileged line 141D which connects the transducers 141 and 142 and extends transversely to the direction of movement in the metal detector, then a second privileged line 143D which connects the transducers 141 and 143 and is oriented obliquely relative to the direction of movement in the metal detector.

FIG. 1b represents one alternative according to which the means 140 are formed of four coil transducers 141, 142, 143 and 144 distributed between the side panels 110, 120 in the form of two coils 141 and 144 in a side panel 120 and two coils 142, 143 in the opposite side panel 110.

The two coils 141 and 144 located in a common side panel 120 are spaced longitudinally. The two coils 142 and 143 located in the other common side panel 110 are also spaced longitudinally.

This configuration allows a metal detection with a three-dimensional location of the metal. This three-dimensional location is made possible by the fact that the individual successively crosses several privileged detection lines which correspond to dummy lines connecting respectively the centers of the transmitting and receiving coils. Thus, if it is arbitrarily considered that the coil 141 located on one side of the detector 100 is a transmitting coil, while the two coils 142 and 143 located on the opposite side of the detector 100 are receiving coils, an individual who moves in the detector 100 successively crosses a first transverse privileged line 141D which connects the transducers 142 and 141, then a second oblique privileged line 143D which connects the transducers 141 and 143. Likewise, if it is arbitrarily considered that the coil 144 located on one side of the detector 100 is a transmitting coil, while the two coils 142 and 143 located on the opposite side of the detector 100 are receiving coils, an individual who moves in the detector 100 successively crosses an oblique privileged line 142D which connects the transducers 144 and 142, then a transverse privileged line 144D which connects the transducers 144 and 143.

Advantageously, the transducers 142 and 143 are placed respectively facing the transducers 141 and 144.

It is furthermore recalled that each of the four transducers 141, 142, 143 and 144 can alternately operate in transmitting mode or in receiving mode.

According to FIGS. 1*a* and 1*b*, the transducers 141, 142, 143 and 144 are configured in the form of a coil wound on respective columns.

Preferably, the width D of each column of the transducers 141, 142, 143 and 144 represented in FIGS. 1*a* and 1*b* is comprised between 140 and 300 mm, the interval L between two adjacent columns 141 and 144, or 142 and 143, is preferably comprised between 1.5 and 3 times the width D, namely between 210 mm and 900 mm, and therefore a center distance between the pairs of transducers comprised between 350 mm and 1,200 mm, while the transverse distance W between the columns of two opposite transducers 141 and 142 or 144 and 143 is preferably comprised between 680 and 820 mm.

Thus, the angle formed between the transverse detection lines 141D and 144D connecting the pairs of opposite transducers 141 and 142 on the one hand and 144 and 143 on the other hand and the oblique sense lines 142D and 143D connecting pairs of transducers located diagonally, is comprised between 15° and 60°, or typically on the order of 30° to 45°.

This angle is important in particular to allow locating the metal targets across the width of the individual, that is to say determining whether the metal targets are located rather on the left or the right of the individual. By defining indeed oblique detection lines 142D and 143D relative to the direction of movement of the individual, this angle imposes detection lines (142/144, 143/141, 144/142, 141/143) which are cut firstly or lastly by one side of the individual.

The location between the front and the back on the individual of the metal targets is, for its part, carried out in particular when the front or the back of the individual crosses the transverse detection lines 141D and 144D (141/142, 143/144, 142/141, 144/143).

Of course, the central unit 50 uses all of the data detected by all of the receiving transducers 141, 142, 143 and 144 to specify the location of the metal targets, left/right, front/back. Indeed, the detected metal objects, whether they are located on the left or on the right of the individual, on the front or on the back of the individual, have an influence when they cross a detection line whether it is transverse or oblique.

FIG. 1*c* represents one alternative similar to FIGS. 1*a* and 1*b* according to which the column transducers 141, 144 and 142, 143 of FIGS. 1*a* and 1*b* are replaced in FIG. 1*c* by panel-type transducers. In FIG. 1*c*, an option with three panel-type transducers 141, 142, 143 is represented in solid lines. An option with four panel-type transducers 141, 142, 143, 144 is also represented in the form of the fourth transducer 144 in broken lines.

Preferably, the width D of each panel of the transducers 141, 142, 143 and 144 represented in FIG. 1*c* is comprised between 140 and 600 mm. The values of the gap L between the transducers, the transverse distance W between the transducers and the angle between the thus formed transverse and oblique detection lines, indicated for FIGS. 1*a* and 1*b* remain applicable to FIG. 1*c*.

The side panels 110, 120 also house the means 130 forming passage detection barriers distributed longitudinally on the path of movement in the channel 102.

The passage detection barriers 130 can be formed of any known technology for example but without limitation of optical barriers.

According to the particular embodiment represented in FIG. 1, three successive passage detection barriers 131, 132 and 133 are thus provided along a path of movement in the metal detector 100.

In practice, each passage detection barrier can comprise a transmitter 131.1, 132.1, 133.1 placed in one of the panels 110 or 120 and a receiver 131.2, 132.2, 133.2 placed opposite each other in the opposite panels 120 or 110. The receiver receives a signal from the transmitter placed oppositely as long as no obstacle is interposed between this receiver and this transmitter. On the other hand, the receiver does not receive the signal emitted by the opposite transmitter when an individual stands between the transmitter and the receiver.

Figure 4A:
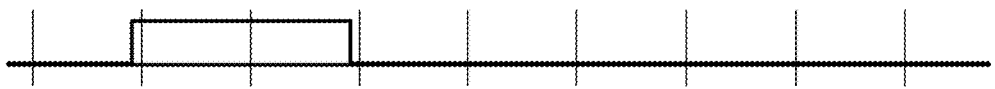
FIGS. 4a, 4b and 4c represent the signals obtained on the exits of the passage detection barriers illustrated in FIG. 2 during the progression of an individual in the passage of the metal detector.
Figure 4B:
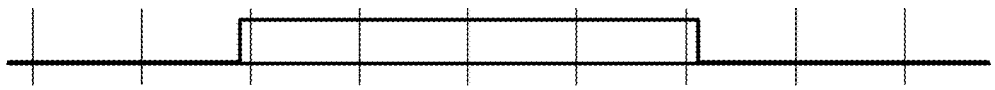
Figure 4C:
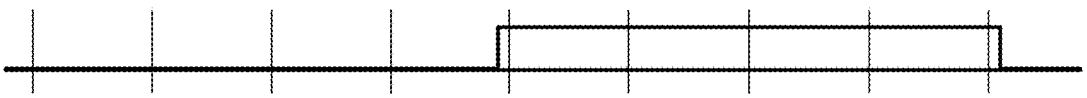
Figure 7A:
FIGS. 7a, 7b and 7c represent the signals obtained on the exits of the passage detection barriers illustrated in FIG. 5 during the progression of an individual in the passage of the metal detector, FIG. 8 schematically represents a flowchart of an example of a detection method in accordance with the present invention, FIG. 9 schematically represents a perspective view of a device in accordance with the present invention integrating a metal detector in a body scanner, FIGS. 10a to 10e schematically represent horizontal sectional views of five alternatives in accordance with the invention of such a body scanner integrating a metal detector, and FIG. 11 schematically represents a flowchart of an exemplary detection method using a device in accordance with the present invention comprising a body scanner which integrates a metal detector.
Figure 7B:
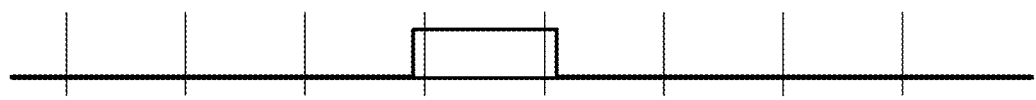
Figure 7C:

The corresponding signals received on the receivers 131.2, 132.2, 133.2 when an individual moves through channel 102 are illustrated in FIGS. 4*a*, 4*b* and 4*c* and in FIGS. 7*a*, 7*b* and 7*c*.

As can be seen in these FIGS. 4*a*, 4*b* and 4*c* and 7*a*, 7*b* and 7*c*, the outlets of the receivers 131.2, 132.2, 133.2 successively change state, in positive or negative logic, during the progression of the individual in the passage 102.

The relative positioning between the passage detection barriers 130, 131, 132 and 133 and the metal detecting transducers 140, 141, 142 and 143 can be the subject of different embodiments and is not limited to the embodiments illustrated in the appended figures. It will be noted for example that the positioning of the safety barriers illustrated in FIGS. 1*a*, 1*b* and 1*c* differs from the one illustrated in FIGS. 2 and 5.

According to the embodiment diagrammatized in FIG. 1, the transducers 141 and 142 are placed opposite each other, on either side of the passageway 102, respectively in the panels 110, 120, at the same longitudinal level in the direction of the passage in the passageway 102. They define the main transverse detection line 141D. The third transducer 143 is offset downstream, with reference to the direction of passage in the passageway 102 relative to the transducer 142, in the same panel 110. It defines in combination with the transducer 141 the main oblique detection line 143D. Likewise, the fourth transducer 144 is offset downstream, with reference to the direction of passage in the passageway 102 relative to the transducer 141, in the same panel 120, facing the transducer 143. It defines, in combination with the transducer 143, the main transverse detection line 144D and defines in combination with the transducer 142 the oblique detection line 142D.

Preferably at least one passage detection barrier 130 coincides in a longitudinal position with a pair of transducers 140 and therefore with a preferred transverse detection line 141D or 144D. According to FIGS. 1 and 5, the barrier 131 coincides with the pair of transducers 141-142, while the barrier 133 coincides with the pair of transducers 143-144. According to FIG. 2, the barrier 132 coincides with the pair of transducers 141-142.

In addition, preferably at least one passage detection barrier 130 coincides in a longitudinal position with the point of intersection between two oblique detection lines 142D and 143D. According to FIGS. 1 and 5, the barrier 132 coincides with the point of intersection between the two oblique detection lines 142D and 143D.

According to the embodiment schematized in FIG. 1, the first passage detection barrier 131 formed by the transmitter 131.1 and the receiver 131.2 is located at the pair of transducers 141 and 142, that is to say on the entrance of the metal detector 100. The central passage detection barrier 132 formed by the transmitter 132.1 and the receiver 132.2 is located between the pair of transducers 141 and 142 and the third transducer 143 or the pair of transducers 143 and 144. The third passage detection barrier 133 formed by the transmitter 133.1 and the receiver 133.2 is located at the transducers 143 and 144.

As indicated above, the positioning of the passage detection barriers 131, 132 and 133 relative to the transducers 140 may be the subject of alternatives. According to the embodiment represented in FIG. 2, the first passage detection barrier 131 formed by the transmitter 131.1 and the receiver 131.2 is located upstream of the pair of transducers 141 and 142, on the entrance of the metal detector 100, the central passage detection barrier 132 formed by the transmitter 132.1 and the receiver 132.2 is located at the pair of transducers 141 and 142 and the third passage detection barrier 133 formed by the transmitter 133.1 and the receiver 133.2 is located between the pair of transducers 141 and 142 and the transducers 143 and 144 placed downstream.

In order to improve the determination of the position of metal objects M1, M2, M3, M4 carried by an individual inspected by the system, the central unit 50 is configured to analyze and use the signals coming from the passage detection barriers 130 and the signals coming from the transducers 140, and deduce from this combined use the position of the metal object(s) M1, M2, M3, M4 relative to the individual.

Indeed, the signals coming from the at least three transducers 141, 142, 143 allow, thanks to the transverse and oblique detection lines, determining the position in width of the metal object on the individual, that is to say whether the metal object is more on the right or on the left of the individual. On the other hand, these detection lines do not allow, on their own, identifying the position in depth of the metal object, that is to say whether the metal object detected by the transducers is rather on the front or on the back of the individual.

On the other hand, thanks to the signals coming from the passage detection barriers 130, the central unit 50 can determine the position of the individual relative to the transducers 140, and more particularly the position of the front face of the individual. The passage detection barriers 130 thus allow the central unit 50 to identify a reference for the front face of the individual that is to say to position the limit of the beginning of the individual's body.

For example, in the case of a detector 100 comprising a passage detection barrier 132 at a first pair of transducers 141, 142 opposite each other (in the direction of passage of the individual in the detector 100), when an individual passes through the detector 100, the barrier 132 detects this passage and generates a passage detection signal. The central unit 50 therefore deduces therefrom the position, at a time t, of the front face of the individual. If no metal object is detected by this first pair of transducers 141, 142 at the time t corresponding to the passage of the front face of the individual, the central unit 50 deduces therefrom that the individual is not carrying any metal object M1 at his front face. On the other hand, in case of detection of a metal object M1-M4 by the first pair of transducers 141, 142 at a moment offset from the time t of the passage detection signal generated by the barrier 132, the central unit 50 deduces therefrom that the metal object M4 is rather located at the back face of the individual than at its front face.

The same reasoning applies when the first passage detection barrier 130 is offset relative to the first transducer, taking into account an offset time due to the distance, in the direction of passage of the individual, between the detection barrier 130 and the pair of transducers 141, 142.

In one embodiment, the detector 100 comprises several passage detection barriers 131, 132, 133. This embodiment further allows improving the determination of the position of the metal objects M1-M4 on the individual, particularly when crossing the oblique detection lines and the possible transverse detection line formed between two other pairs of transducers 143, 144 opposite each other, and validating the detection of the metal objects M1-M4 and their location on the body of the individual (see in particular the flowchart in FIG. 8, steps 208/226 and 216/234).

The main steps of the method in accordance with the invention using a metal detector with three inductive transducers 141, 142 and 143 of the type illustrated in FIG. 1a, in relation to FIGS. 2, 3 and 4 will now be described.

The three transducers 141, 142 and 143 allow in combination a spatial discrimination of the location of the detected metal objects.

Indeed, and as detailed above, the analysis of the evolution of the signals coming from the passage detection barriers 130 represented in FIGS. 4a, 4b and 4c, which allows defining the position of the individual in the metal detector 100 and therefore relative to the transducers 140, combined with the analysis of the signals coming from the metal detecting transducers 140, allows both the detection of a metal object carried by an individual and the location of the three-dimensional spot of the positioning of this object on the body of the individual.

Arbitrarily, FIGS. 2, 3 and 4 illustrate the case of the passage through a walk-through metal detector 100 in accordance with the invention, of an individual carrying metal objects M1 on his front, M4 on his back and M2 and M3 on his left and right sides.

Figure 3A:
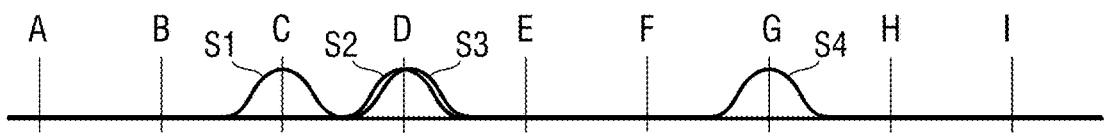
FIGS. 3a and 3b represent the signals obtained on the receiving transducers illustrated in FIG. 2 during the progression of an individual carrying metal objects on his front, on his back and on his left and right sides, in the passage of the metal detector.

In FIG. 3a, S1, S2, S3 and S4 refer to 4 signal components coming from the receiving transducer 142 associated with a transmitting transducer 141 during the successive passage of the masses M1, M2, M3 and M4 through the transverse detection line 141D.

Figure 3B:
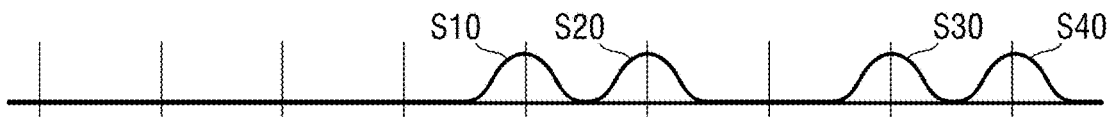

In FIG. 3b, S10, S20, S30 and S40 refer to 4 signal components coming from the receiving transducer 143 associated with the transmitting transducer 141 during the successive passage of the masses M1, M2, M3 and M4 through the oblique detection line 143D.

Figure 2A:
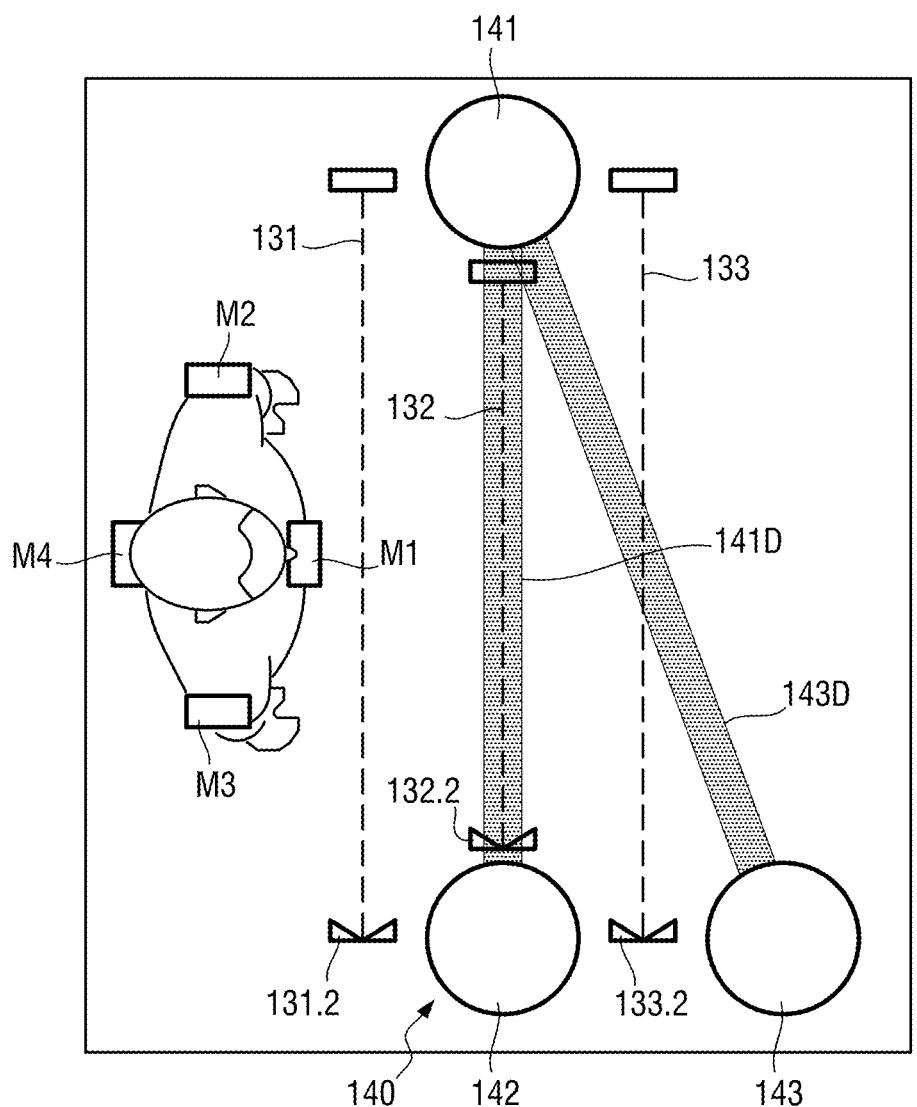
FIGS. 2a to 2i represent a series of detection sequences made using the metal detector in accordance with the present invention comprising three transducers, during the progression of an individual in the channel of the metal detector, more specifically nine successive steps of this detection process.
Figure 2B:
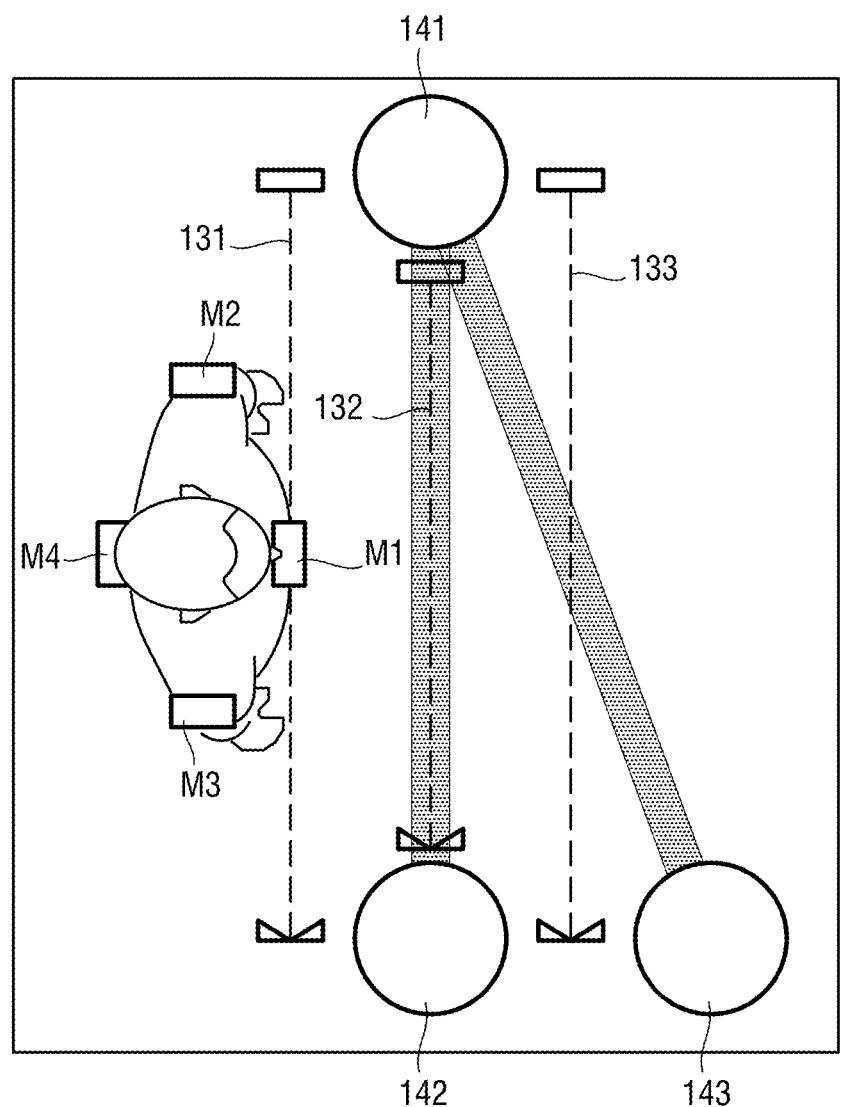
Figure 2C:
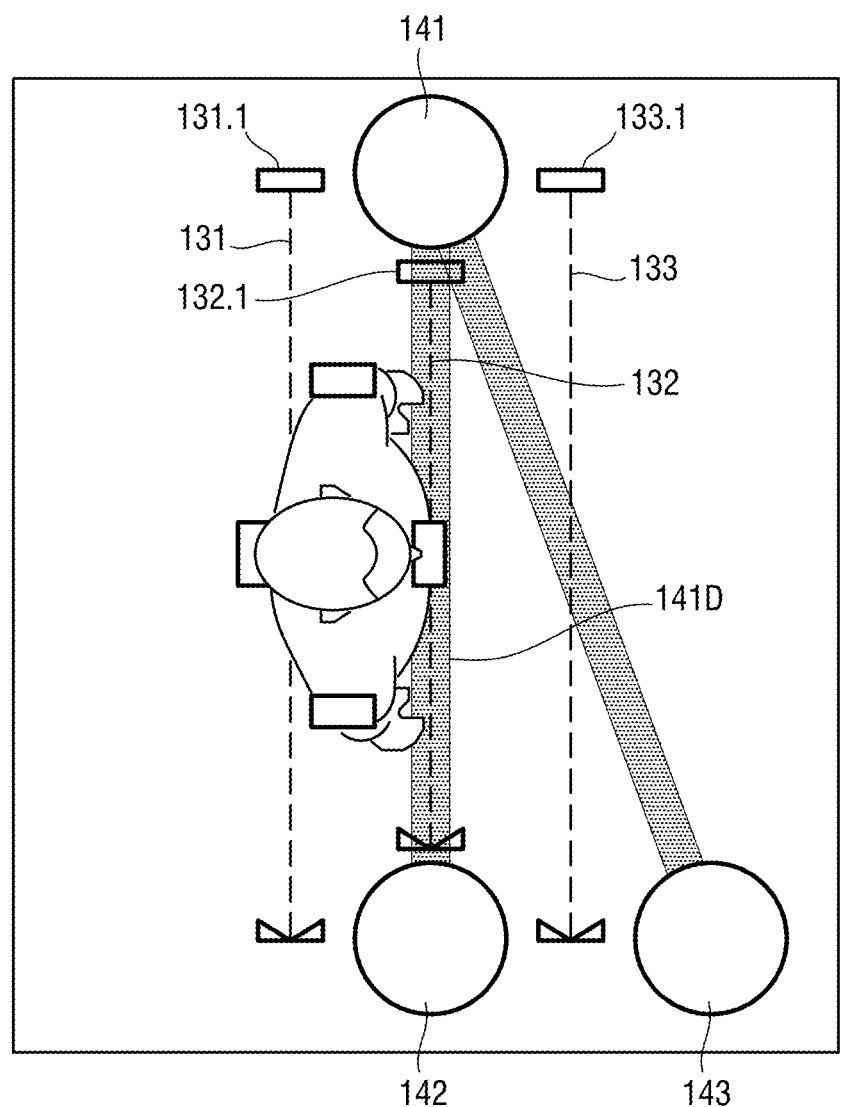
Figure 2D:
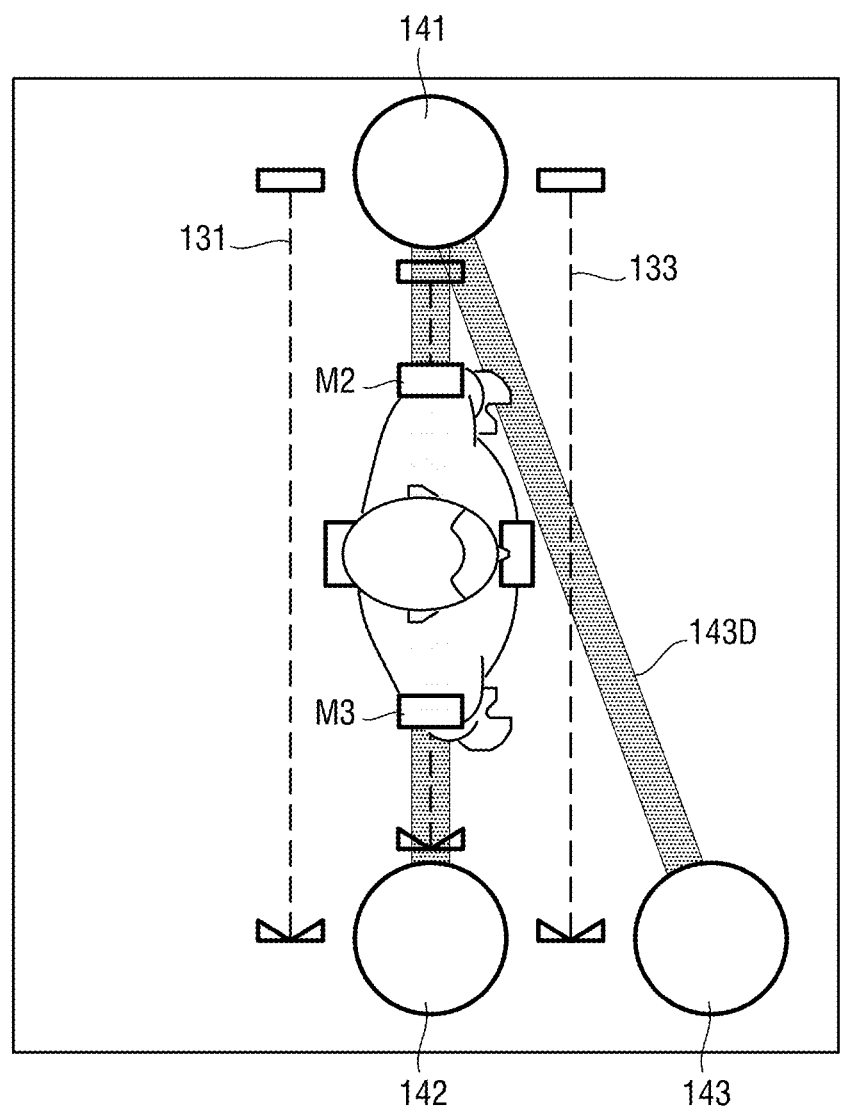
Figure 2E:
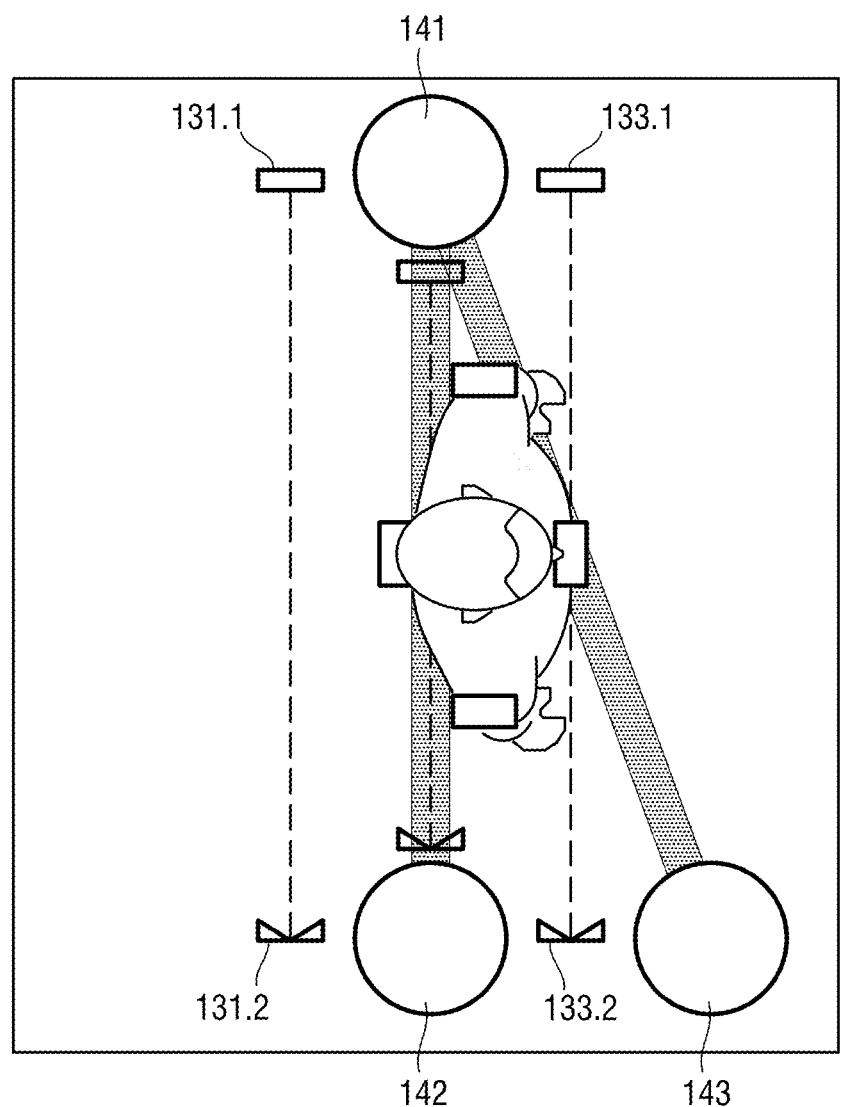
Figure 2F:
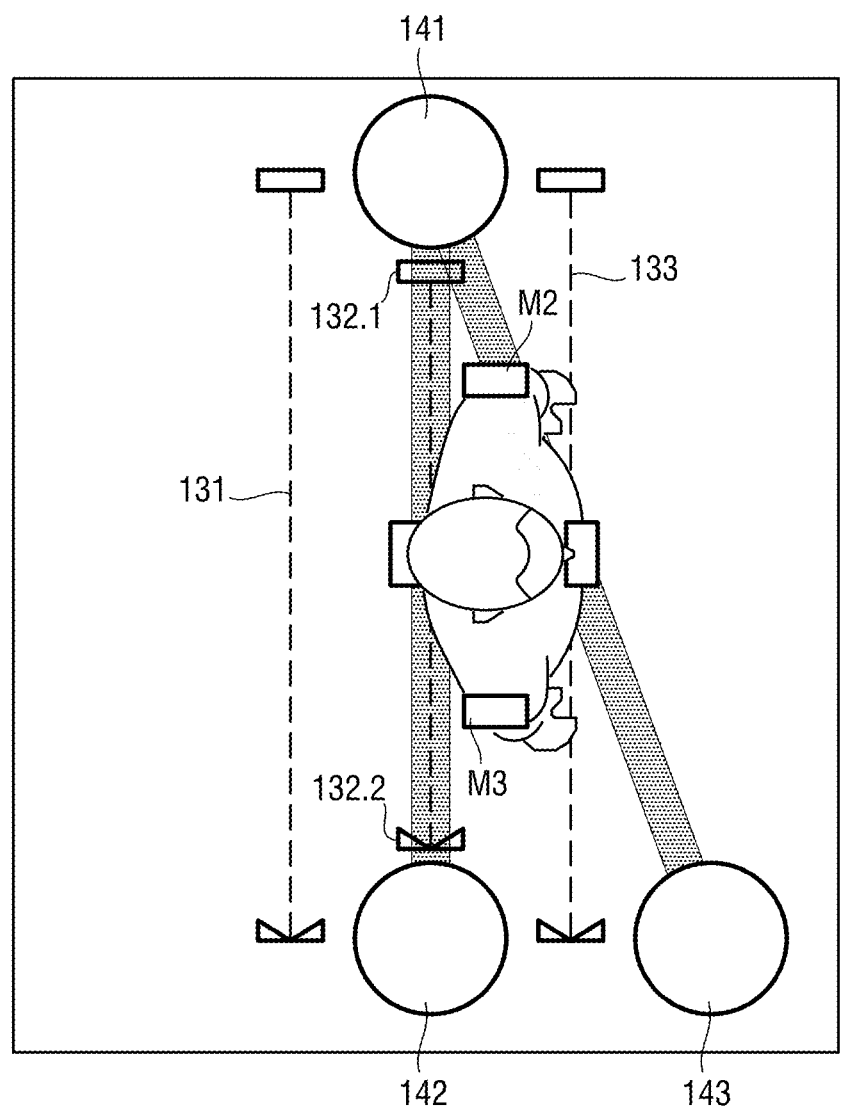
Figure 2G:
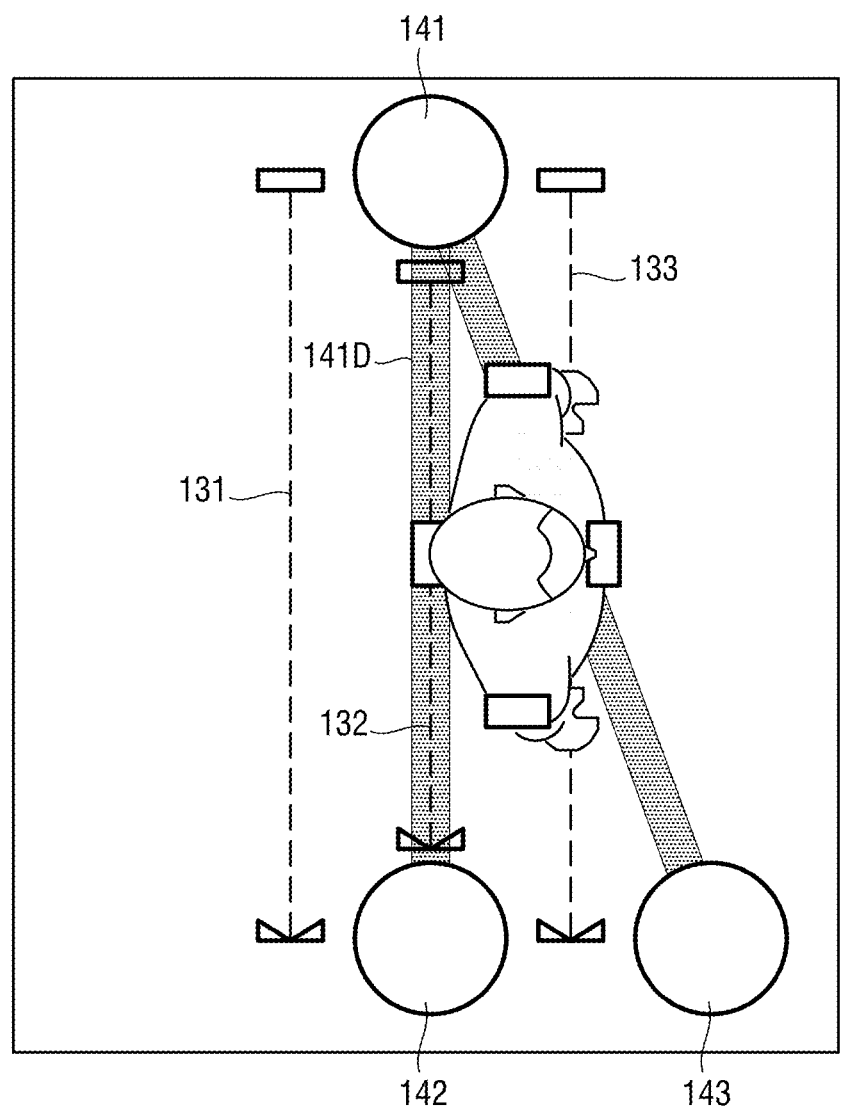
Figure 2H:
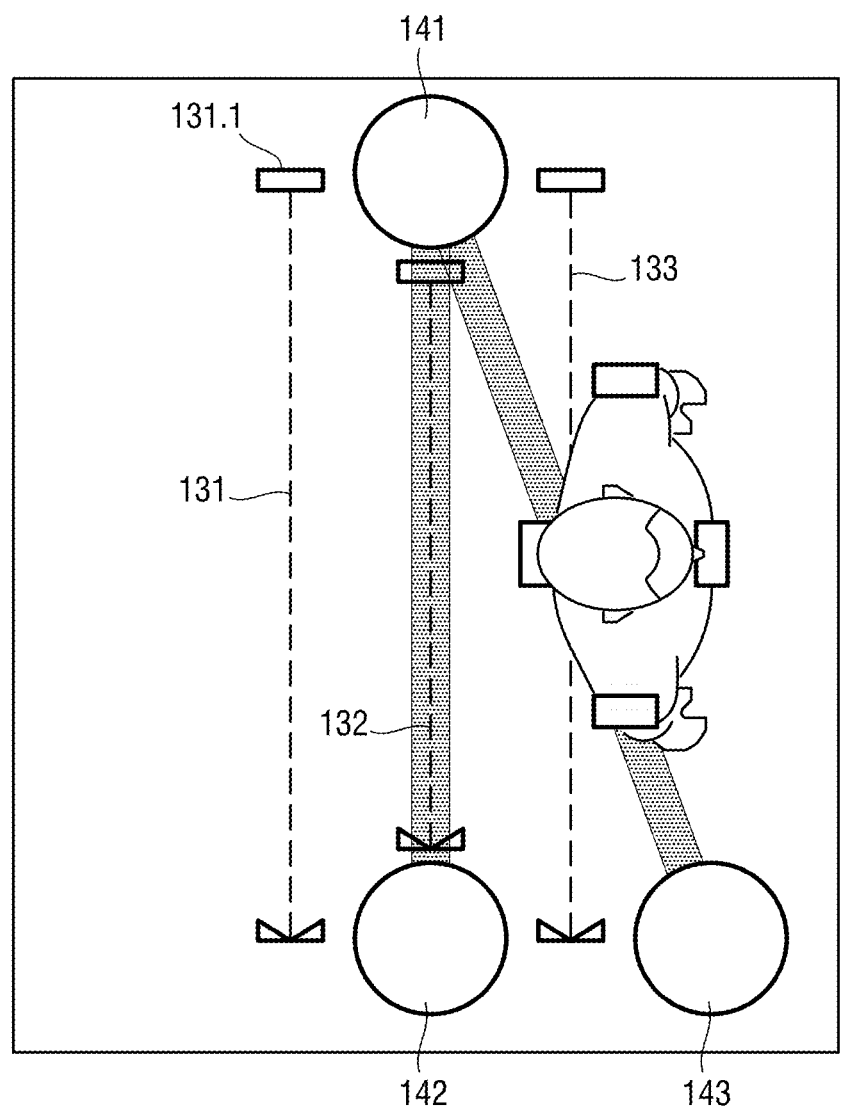
Figure 2I:
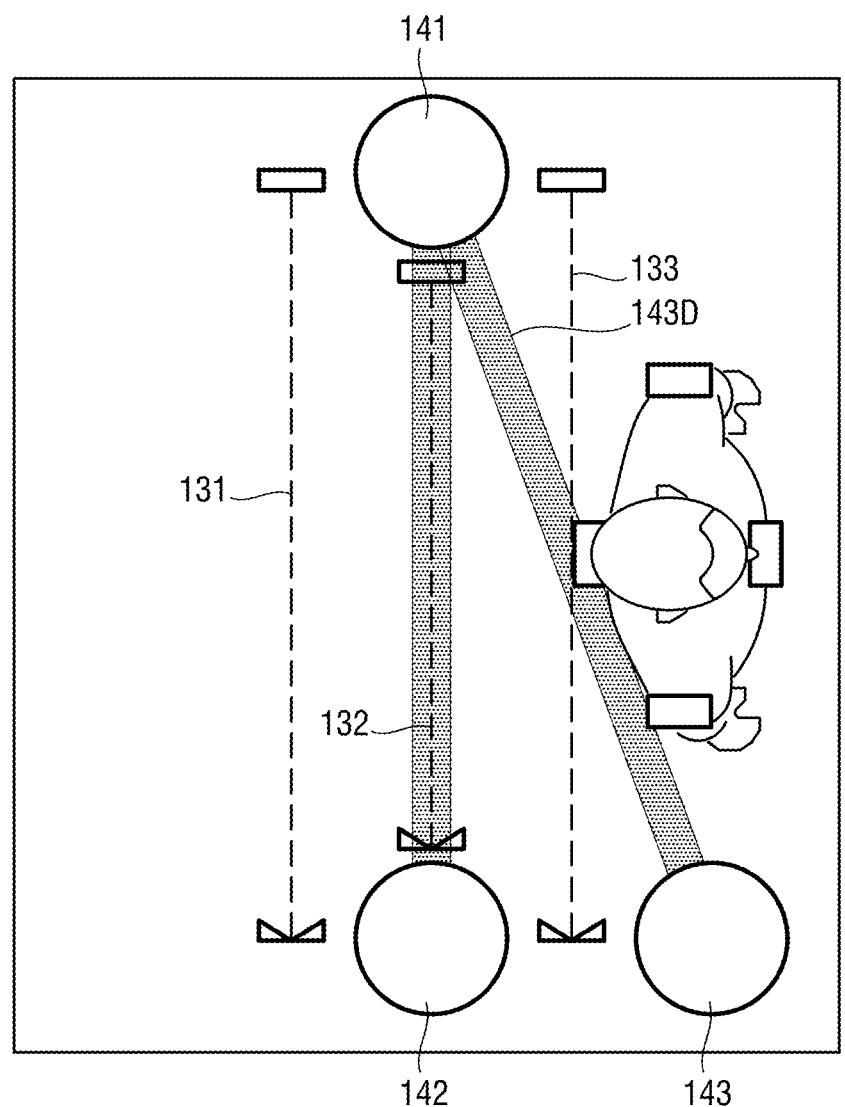

It is understood in relation to the appended FIGS. 2, 3 and 4, given by way of non-limiting example that:
  the combined detection of the signal S1 on the transducer 142 and of the signal coming from the barrier 132, when the individual reaches the barrier 132 and the transverse detection line 141D, which corresponds to the position illustrated in FIG. 2c, allows detecting the presence of the metal object M1 placed on the front of the individual,
  the detection of metal by the signal S2 and S3 coming from the transducer 142 when the individual crosses the transverse detection line 141D connecting the transmitter 141 and the receiver 142, which corresponds to the position illustrated in FIG. 2d (crossing detected by the barrier 132) allows generating an additional metal presence alert interpreted a priori as the presence of at least one metal object on at least one side of the individual, the detection of the signal S4 on the transducer 142 when the individual leaves the barrier 132 (which therefore no longer detects the presence of the individual) and the transverse detection line 141D, which corresponds to the position illustrated in FIG. 2g, allows detecting the presence of the metal object M4 placed on the back of the individual, the detection of the signal S10 on the transducer 143 and of the signal coming from the barrier 133, when the individual reaches the barrier 133 and the oblique detection line 143D, which corresponds to a position illustrated in FIG. 2e allows validating the presence of the metal object M1 on the front of the individual, the detection of the signal S20 on the same transducer 143 when the individual progresses through the crossing of the barrier 133 and of the oblique detection line 143D, as illustrated in FIG. 2f, allows detecting the presence of the metal object M2 on the left side of the individual, the detection of the signal S30 on the same transducer 143 when the individual is still progressing through the crossing of the barrier 133 and of the oblique detection line 143D, as illustrated in FIG. 2h, allows detecting the presence of the metal object M3 on the right side of the individual, and the detection of the signal S40 on the transducer 143 when the individual leaves the barrier 133 (which therefore no longer detects the presence of the individual) and the oblique detection line 143D, which corresponds to the position illustrated in FIG. 2i, allows validating the presence of the metal object M4 on the back of the individual.

The location in height of the objects M1, M2, M3 and M4 on the individual is made in a manner known per se according to the conventional modalities of metal detection in the known walk-through detectors, in particular thanks to a division of the coils in height in order to define distinct detection areas in height.

An exemplary embodiment has previously been described according to which the transducer 141 is a transmitting transducer and the transducers 142 and 143 placed on the opposite side are receiving transducers.

However, the reverse disposition can be provided, namely a receiving transducer 141 and transmitting transducers 142 and 143 placed on the opposite side.

The analysis of the signals coming from the transducers 141, 142 and 143 associated with the analysis of the signals coming from the passage detection barriers 131, 132 and 133 remains identical.

However, in this case, the signals illustrated in FIGS. 3a and 3b correspond to the signals received on the receiver 141 when respectively the transducers 142 and 143 are transmitting transducers. These signals can be distinguished by the respectively specific frequencies of the transmitters 142 and 143.

Preferably each of the transducers 141, 142 and 143 is very preferably used alternately and successively as a transmitter and a receiver. A signal redundancy which allows validating and making the detection more reliable is thus obtained.

Figure 3C:
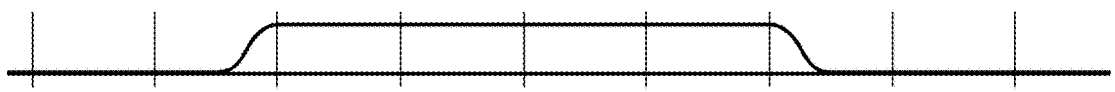
FIGS. 3c and 3d schematically represent the signals obtained on the receiving transducers illustrated in FIG. 2 during the progression of an individual in the passage of the metal detector in the theoretical hypothesis of a metal object completely surrounding an examined individual.
Figure 3D:
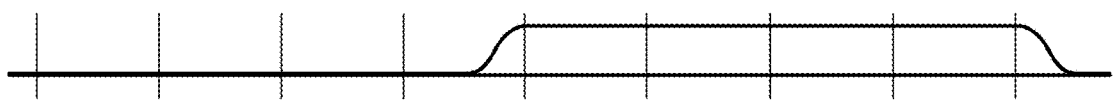

FIGS. 3c and 3d schematically represent signals coming from the receiving transducers 142 and 143 in the hypothesis of a metal object completely surrounding the section of the examined individual, for example surrounding the waist of the individual. As seen in FIG. 3c, in this case a metal object detection signal is initiated as soon as the detection barrier 132 generates a presence detection signal, when the individual begins to cross the detection barrier 132 and the transverse detection line 141D as illustrated in FIG. 2c and ends when the detection barrier 132 no longer detects the presence of the individual, that is to say when the individual has passed the barrier 132 and the transverse detection line 141D as illustrated in FIG. 2g. In a similar manner, as seen in FIG. 3d, a metal object detection signal is initiated as soon as the detection barrier 133 generates a presence detection signal, when the individual begins to cross the oblique detection line 143D as illustrated in FIG. 2e and ends when the detection barrier 133 no longer detects the presence of the individual, that is to say when the individual has passed the detection barrier 133 and the oblique detection line 143D as illustrated in FIG. 2i.

When the metal target is not formed of a continuous belt surrounding the individual, but of a series of discrete objects distributed over the periphery of the individual, the signal coming from the receiving transducers 142 and 143 is formed of a series of pulses distributed over time between the beginning and the end of the crossing of the detection barriers 132, 133 and of the transverse 141D and oblique 143D detection lines, in a similar manner to FIGS. 3a and 3b.

FIG. 5 represents another alternative according to which the metal detector 100 comprises four transducers 141, 142, 143 and 144 forming two transmitters and two receivers, disposed in the form of two transducers located on a first side of the passage 102 and two transducers disposed on the opposite side of this passage 102, respectively in the side panels 110 and 120, in accordance with FIG. 1b.

It is recalled that each of these transducers 141, 142, 143 and 144 can alternately form a transmitter and a receiver. When it constitutes a transmitter, it preferably cooperates with two receivers placed on the opposite side of the passageway 102. When it constitutes a receiver, it preferably cooperates with two transmitters placed on the opposite side of the passageway 102.

The four transducers 141, 142, 143 and 144 thus define four main detection areas or lines 141D, 144D, 143d and 142D defined respectively between the transducers 141 and 142, 144 and 143, 141 and 143, 144 and 142.

Preferably, the frequency of the signals emitted by a transmitter 140 and detected respectively on two associated receivers differs from one receiver to the other and likewise the frequency of the signals emitted by two transmitters 140 and intended to be detected by a common receiver differs from one transmitter to the other to allow distinguishing the main detection area or line 141D, 142D, 143D or 144D concerned.

The main steps of the method in accordance with the invention will now be described using a metal detector with four inductive transducers 141, 142, 143, 144 of the type illustrated in FIG. 1b, in relation to FIGS. 5, 6 and 7, again arbitrarily in the case of the passage through a walk-through metal detector 100 in accordance with the invention, of an individual carrying metal objects M1 on his front, M4 on his back and M2 and M3 on his left and right sides.

Figure 6A:
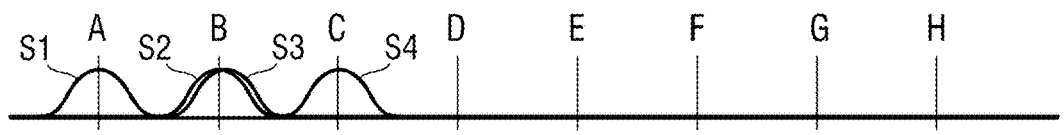
FIGS. 6a, 6b, 6c and 6d represent the signals obtained on the receiving transducers illustrated in FIG. 5 during the progression of an individual in the passage of the metal detector following the successive activation of the transmitting transducers, FIGS. 6e, 6f, 6g and 6h schematically represent the signals obtained on the receiving transducers illustrated in FIG. 5 during the progression of an individual in the passage of the metal detector under the theoretical hypothesis of a metal object totally surrounding an examined individual.

FIG. 6a represents the signal S1, S2, S3, S4 coming from the receiving transducer 142 when the facing transducer 141 is a transmitting transducer.

Figure 6B:
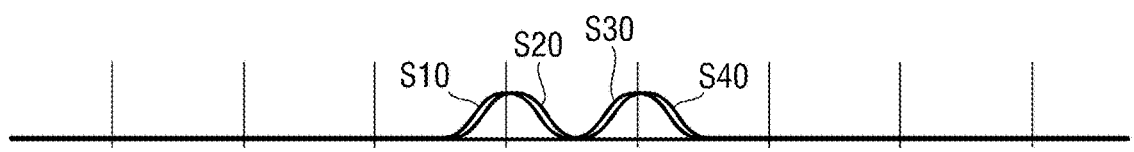

FIG. 6b represents the signal S10, S20, S30, S40 coming from the receiving transducer 143 when the diagonal transducer 141 is a transmitting transducer.

Figure 6C:
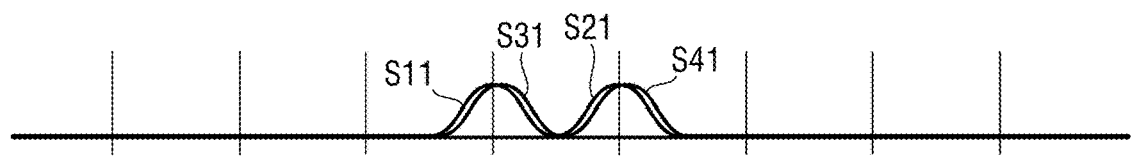

FIG. 6c represents the signal S11, S21, S31, S41 coming from the receiving transducer 142 when the diagonal transducer 144 is a transmitting transducer.

Figure 6D:
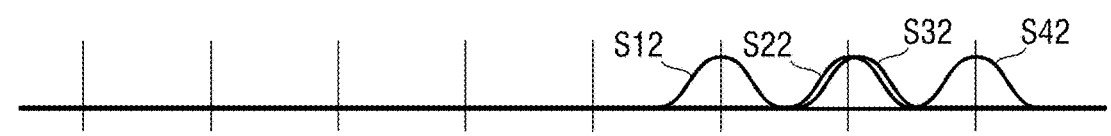
Figure 6E:
Figure 6F:
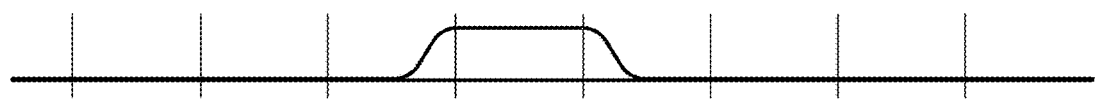
Figure 6G:
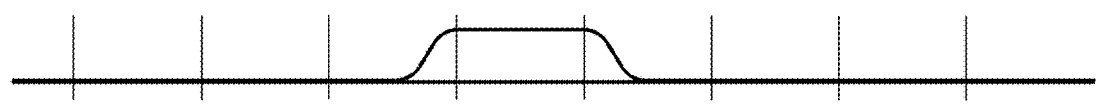
Figure 6H:

FIG. 6d represents the signal S12, S22, S32, S42 coming from the receiving transducer 143 when the facing transducer 144 is a transmitting transducer.

It is recalled that according to the embodiment represented in FIG. 5, the four transducers 141, 142, 143 and 144 are associated with three successive passage detection barriers 131, 132 and 133 along the path of movement in the metal detector 100.

According to the particular and non-limiting embodiment illustrated in FIG. 5, the entrance barrier 131 coincides with the transverse detection line 141D and the pair of transducers 141 and 142, the exit barrier 133 coincides with the transverse detection line 144D and the pair of transducers 143 and 144, and the intermediate barrier 132 coincides with the point of intersection between the two oblique detection lines 143D and 144D.

The passage detection barriers 130 can again be formed of any known technology, for example but without limitation of optical barriers.

In practice, each passage detection barrier can comprise, in a similar manner to FIG. 2, a transmitter 131.1, 132.1, 133.1 placed in one of the panels 110 or 120 and a receiver 131.2, 132.2, 133.2 placed opposite each other in the opposite panel 120 or 110. The receiver receives a signal from the transmitter placed oppositely as long as no obstacle is interposed between this receiver and this transmitter. On the other hand, the receiver does not receive the signal emitted by the facing transmitter when an individual stands between the transmitter and the receiver.

The corresponding signals received on the receivers 131.2, 132.2, 133.2 when an individual moves through channel 102 are illustrated in FIGS. 7a, 7b and 7c.

As can be seen in these FIGS. 7a, 7b and 7c, the exits of the receivers 131.2, 132.2, 133.2 successively change state, in positive or negative logic, during the progression of the individual in the passage 102.

The relative positioning between the passage detection barriers 131, 132, and 133 and the metal detecting transducers 140 may be the subject of different embodiments and is not limited to the disposition represented in FIG. 5.

Figure 5A:
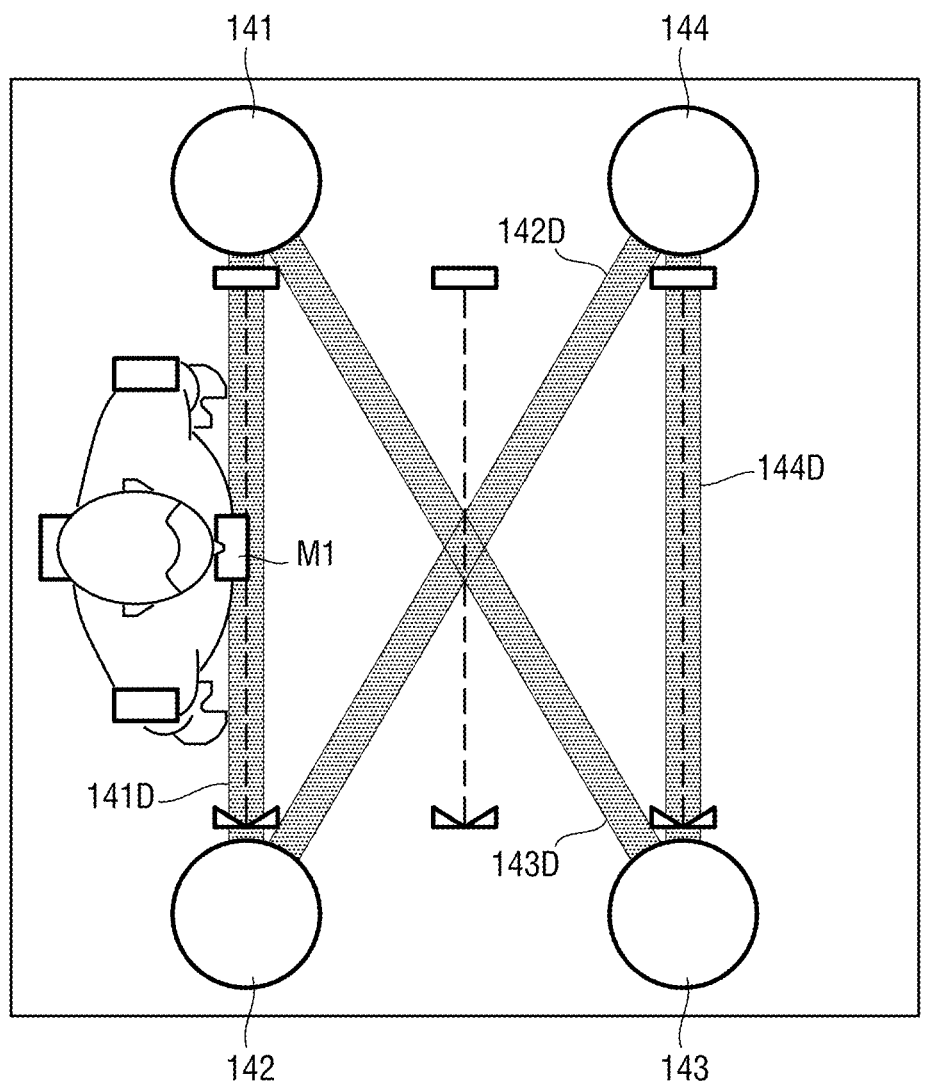
FIGS. 5a to 5h represent eight successive steps of this detection process.
Figure 5B:
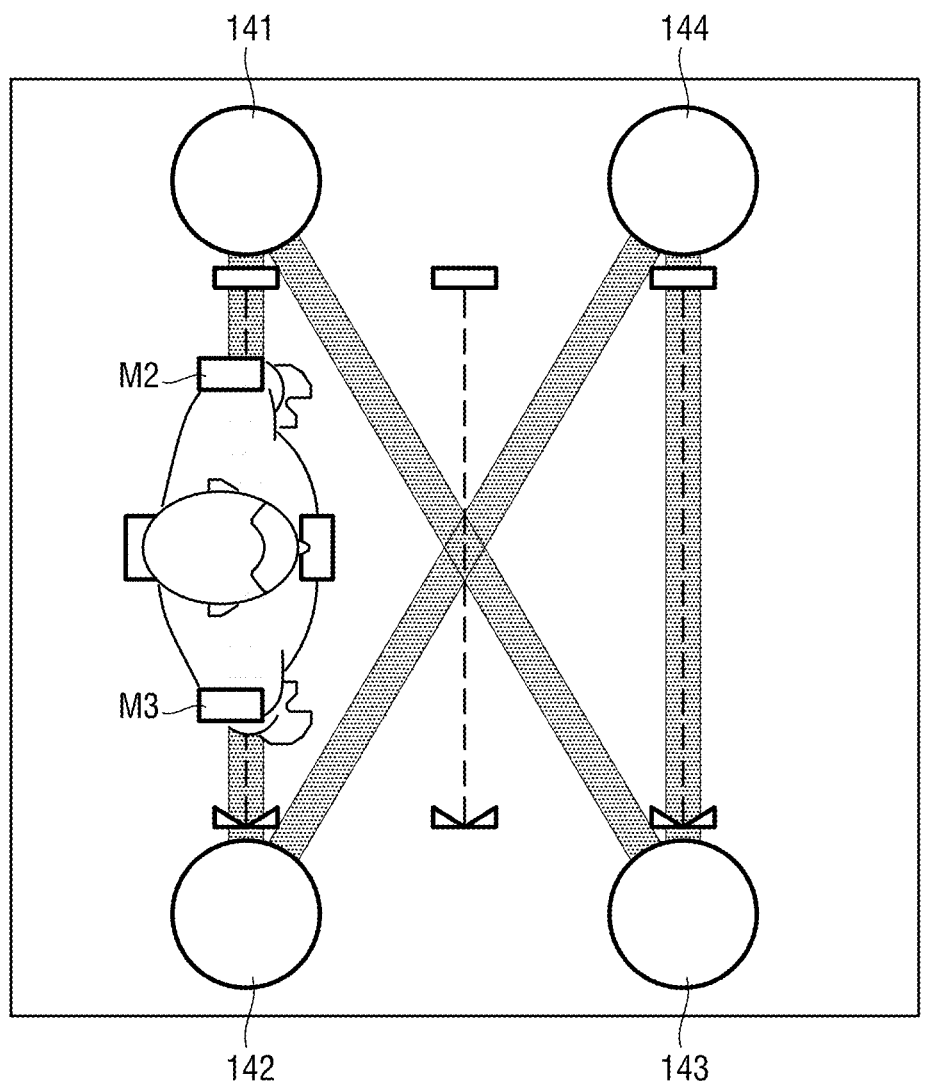
Figure 5C:
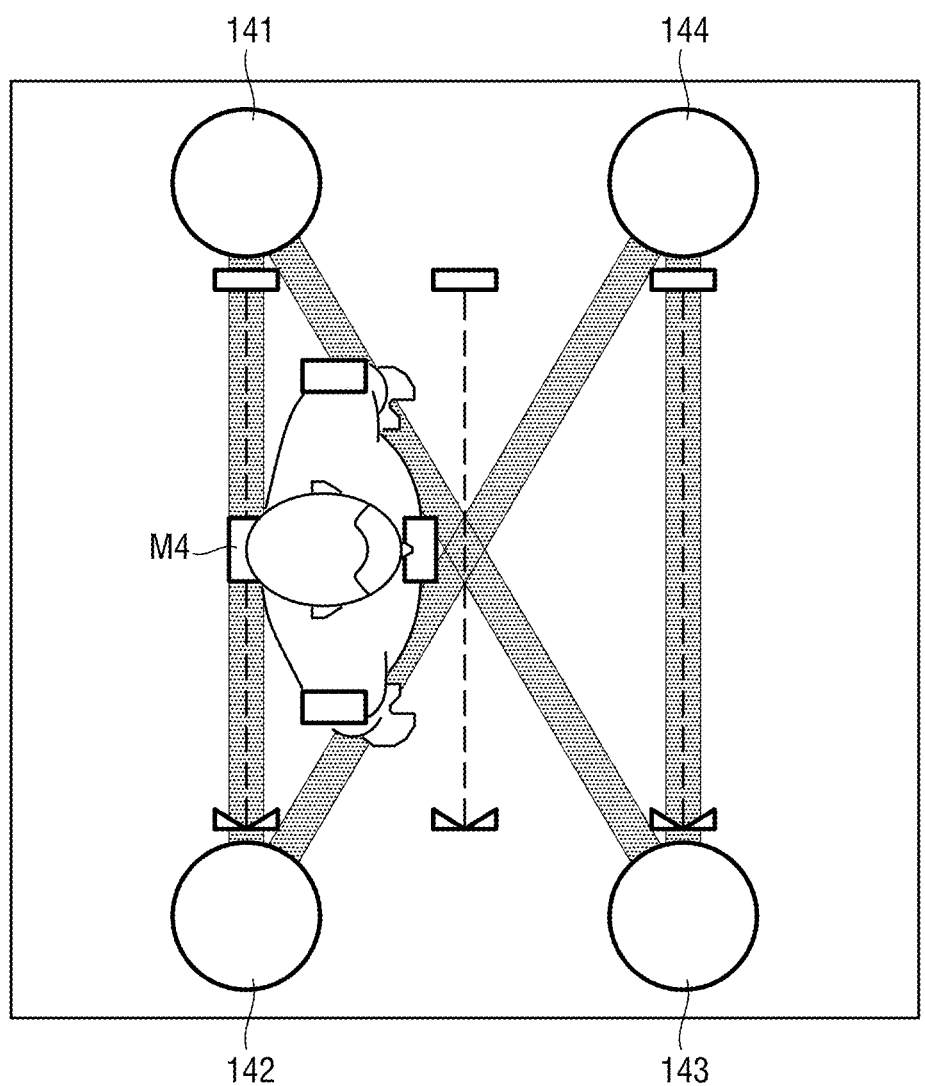
Figure 5D:
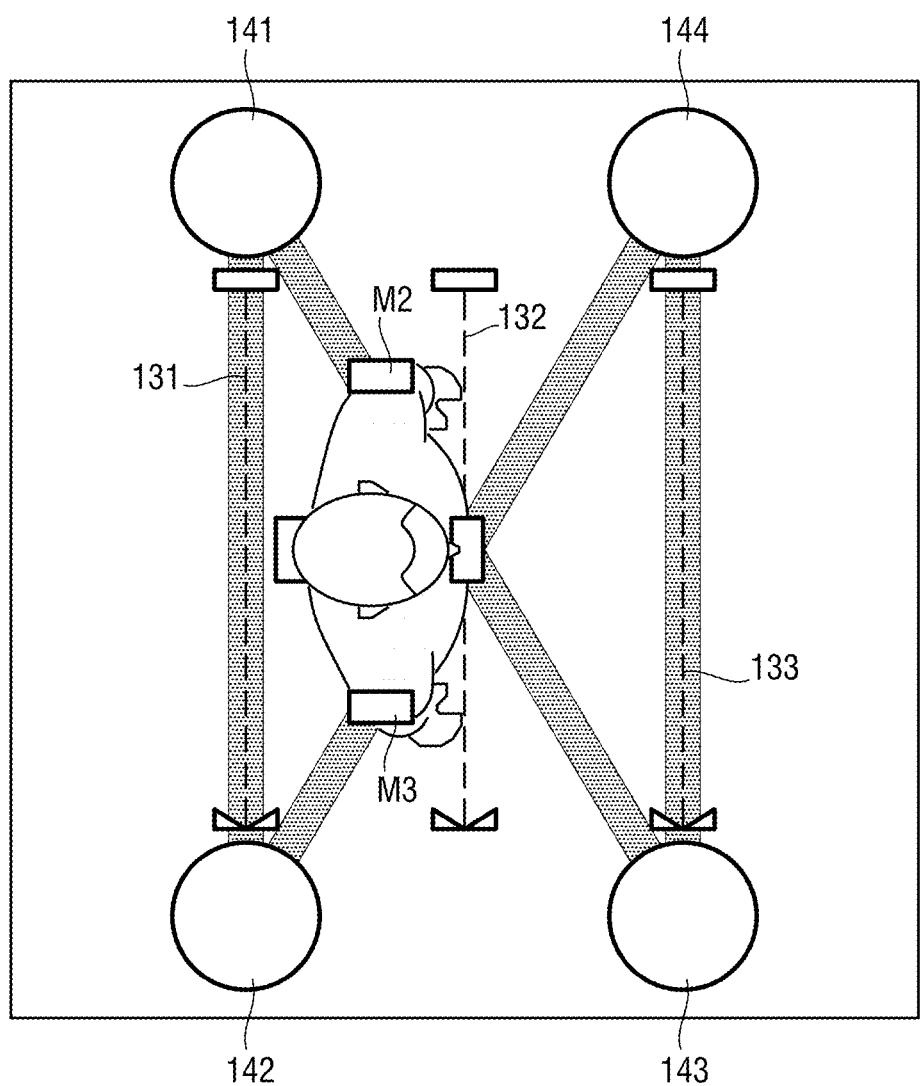
Figure 5E:
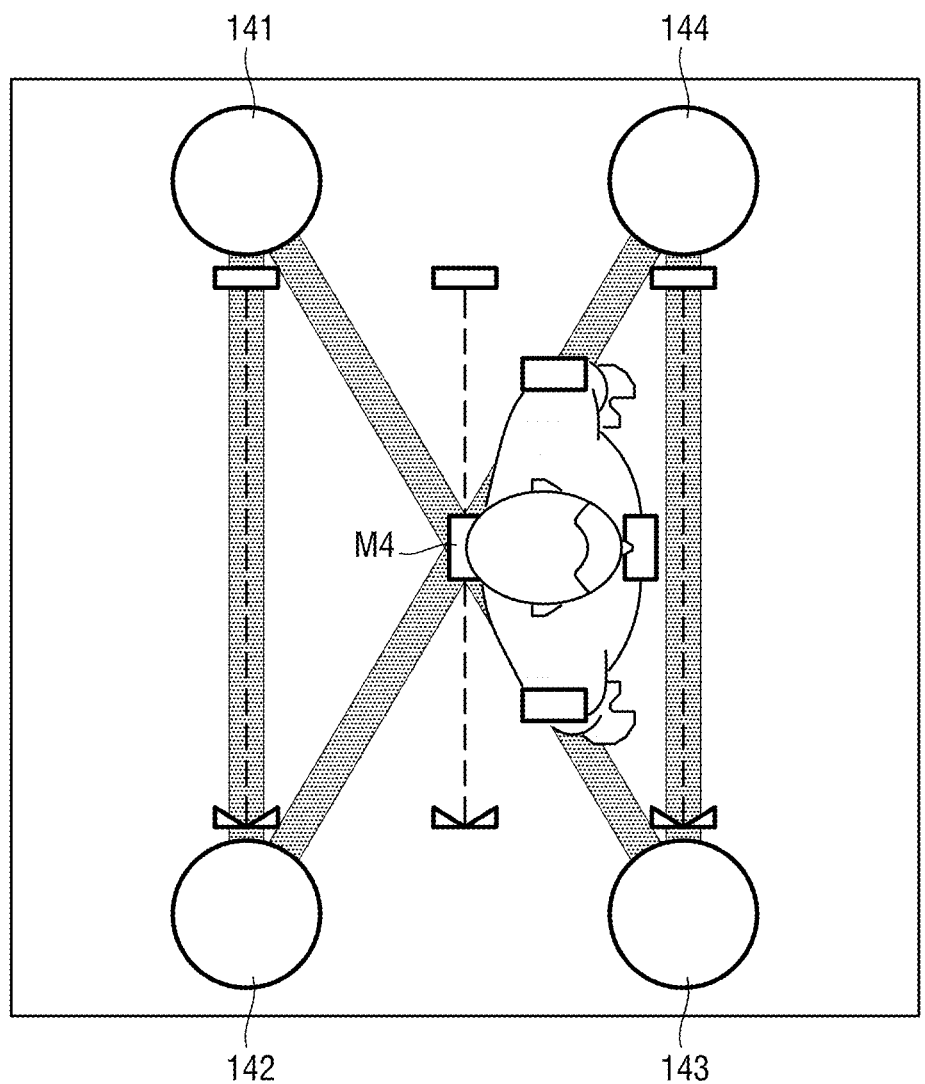
Figure 5F:
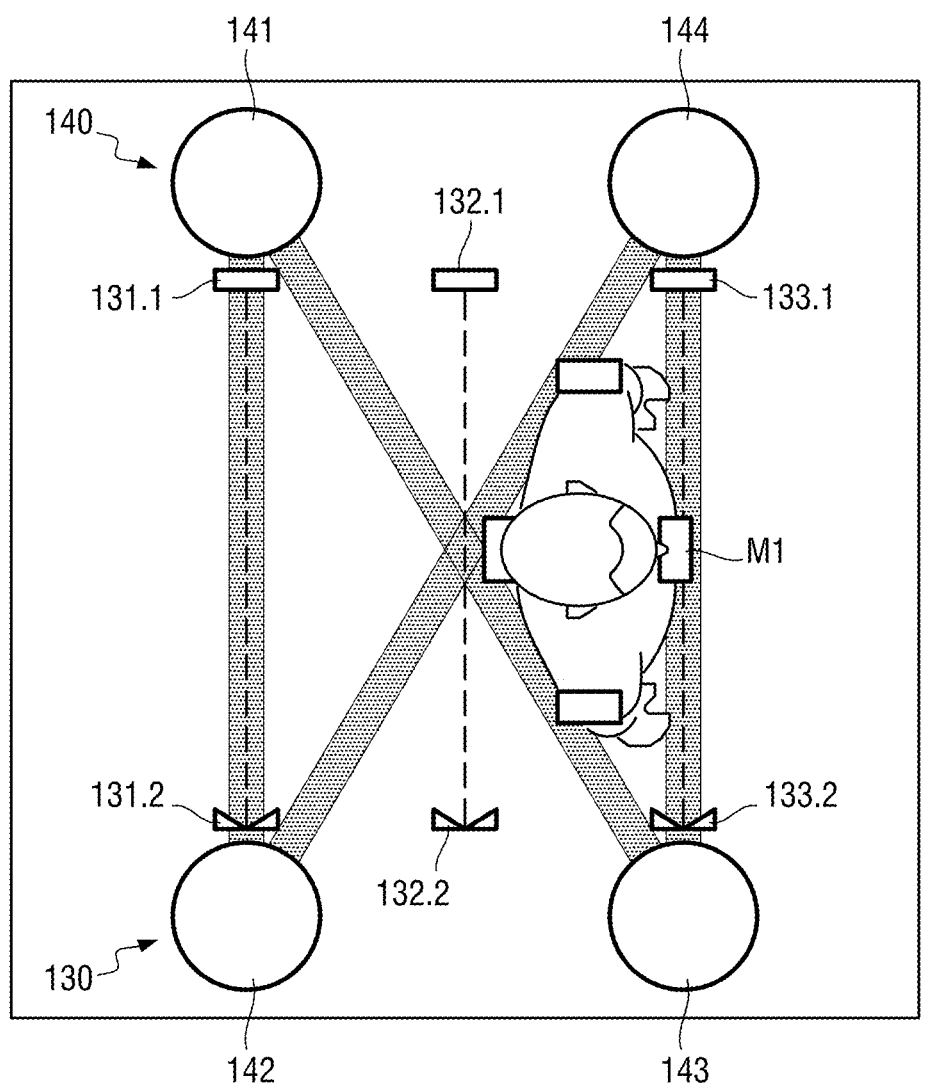
Figure 5G:
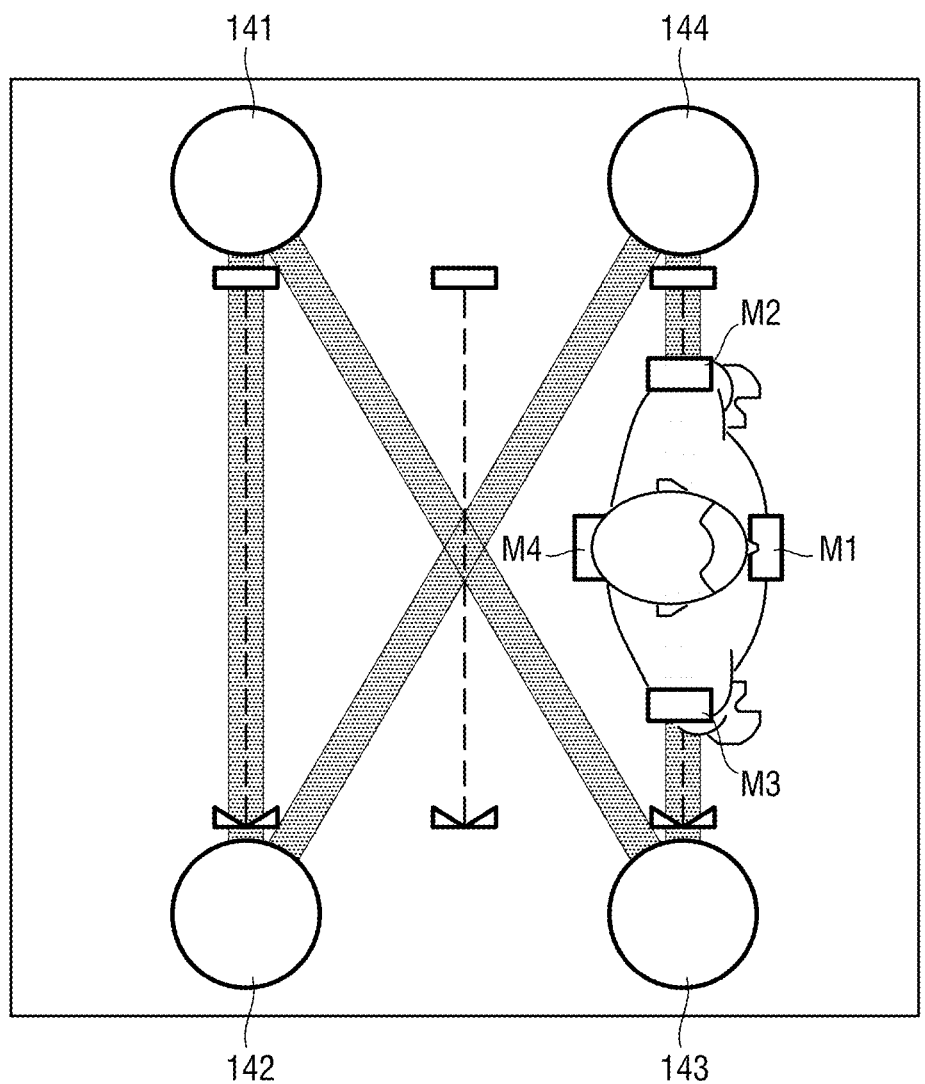
Figure 5H:
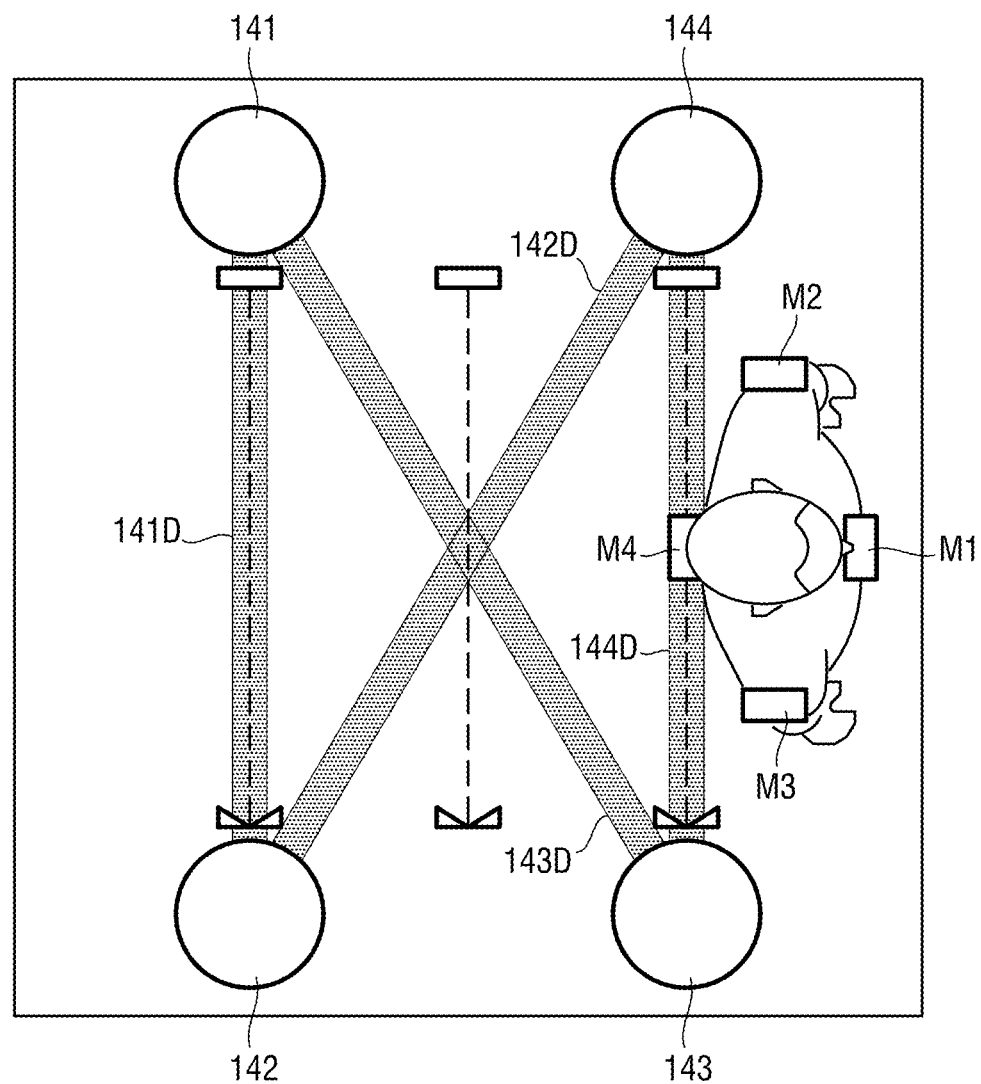

It is understood in particular in relation to the appended FIGS. 5, 6 and 7, given by way of non-limiting example that:
the detection of a metal object M1 carried by an individual on the front of his body can be made thanks to the passage detection barriers 131 and 133 (in combination with the signals S1, S10, S11 and S12), whose signals allow the central unit 50 to determine that the individual reaches and begins to cross the detection lines 141D and 144D formed respectively between the pair of transducers 141 and 142 and the pair of transducers 143 and 144 (these positions are represented in FIGS. 5a and 5f and also correspond to the crossing of the passage barriers 131 and 133), as well as when the individual reaches the intersection of the detection lines 142D and 143D and the central passage barrier 132 as represented in FIG. 5d,
the detection of a metal object M2 on the left side of the individual can be made (signal S20, S21) when the individual crosses the first oblique detection line 143D defined between the transducers 141 and 143 (this position is represented in FIG. 5d) or when the individual crosses the second oblique detection line 142D defined between the transducers 142 and 144 (this position is represented in FIG. 5e). Incidentally, the detection of a metal object M2 on the left side of the individual can also be made (signal S2, S22) when crossing the transverse detection lines 141D and 144D coinciding with the barriers 131 and 133 as illustrated in the FIGS. 5b and 5g,
the detection of a metal object M3 on the right side of the individual can be made (signal S30, S31) when the individual crosses the first detection line 142D defined between the transducers 142 and 144 (this position is also represented In FIG. 5d) or when the individual crosses the second oblique detection line 143D defined between the transducers 141 and 143 (this position is represented in FIG. 5e); the detection of the object M3 located on the right side of the individual can also be made (signal S3, S32) when this object crosses the transverse detection lines 141D and 144D as represented in FIGS. 5b and 5g and
the detection of a metal object M4 carried by an individual on the back of his body can be made thanks to the passage detection barriers 131 and 133 (in combination with the signals S4, S42) whose signals allow the central unit 50 to determine that the individual leaves the detection lines 141D and 144D formed respectively between the pair of transducers 141 and 142 and the pair of transducers 143 and 144 (these positions also correspond to the crossing of the passage barriers 131 and 133 illustrated in the FIGS. 5c and 5h), as well as (signal S40, S41) when the individual reaches the intersection of the detection lines 142D and 143D and the central passage barrier 132 (FIG. 5e).

It is recalled that, similarly to FIG. 2, the location in height of the objects M1, M2, M3 and M4 on the individual is made in a manner known per se according to the conventional modalities of metal detection in the known walk-through detectors, in particular thanks to a division of the coils in height in order to define distinct detection areas in height.

FIGS. 6e, 6f, 6g and 6h schematically represent signals coming from the receiving transducers 142, 143 when the transducers 141 and 144 are successively transmitting transducers, in the hypothesis of a metal object completely surrounding the section of the examined individual, for example surrounding the waist of the individual. As seen in FIGS. 6e to 6h, in this case, the transducers 142 and 143 initiate a metal object detection signal when the individual begins to cross the corresponding detection line and ends this detection signal when the individual has passed the corresponding detection line.

When the metal target is not formed of a continuous belt surrounding the individual, but of a series of discrete objects distributed over the periphery of the individual, the signal coming from the receiving transducers 142 and 143 is formed of a series of pulses distributed over time between the beginning and the end of the crossing of the detection barrier and of the transverse 141D, 144D and oblique 142D, 143D detection lines, in a similar manner to FIGS. 6a, 6b, 6c and 6d.

It will be understood upon reading the description above that the device in accordance with the invention which combines a metal detector 100 comprising at least three detecting transducers 140, 141, 142 and 143, or 144, and passage detection barriers 130, 131, 132 and 133, allows by search for coincidence between the signals coming from the metal detector 100 formed by the transducers 140 and the signals coming from the passage detection barriers 130 or interpretation of the signals coming from the transducers 140 based on the signals coming from the passage detection barriers 130, which allow positioning an individual in the passageway 102, discriminating the position of a detected metal object, on the one hand in the width direction of the passage, transversely to the direction of movement, typically on the left or on the right of an individual, and on the other hand in the depth direction, longitudinally parallel to the direction of movement, typically on the front or on the back of an individual.

As indicated in the preamble, the invention also relates to a method for detecting fraudulent objects carried by an individual using the aforementioned device comprising an advanced metal detector 100. This method comprises in particular the steps of making a detection of metal objects carried by an individual with location in the three-dimensional space on the individual of the metal objects detected using the metal detector 100.

Figure 8:
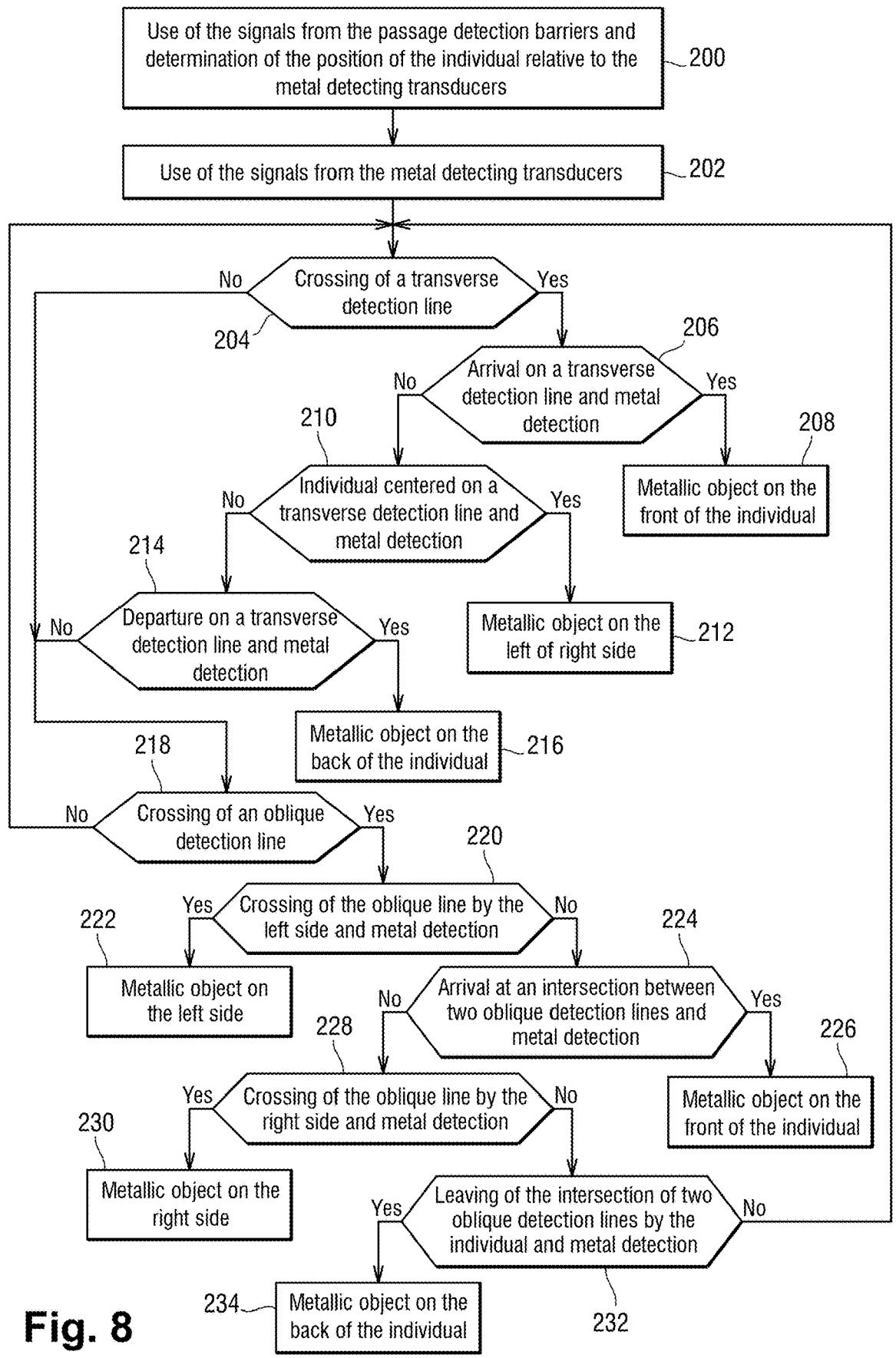

FIG. 8 schematizes a non-limiting example of implementation of the detection method in accordance with the present invention.

FIG. 8 shows a flowchart which comprises the following steps:
  Initial step 200 of using the signals coming from the passage detection barriers 130 and determining the position of the individual relative to the metal detecting transducers 140,
  Step 202 of using the signals coming from the metal detecting transducers 140,
  Step 204 of searching for the crossing of a transverse detection line 141D, 144D,
  If so, step 206 of finding out whether this crossing corresponds to the arrival on a transverse detection line accompanied by a metal detection,
  If so, step 208 of validating the detection of a metal object M1 on the front of an individual,
  In case of negative response in step 206, step 210 of searching for an individual centered on a transverse detection line accompanied by a metal detection,
  If so, step 212 of validating the detection of a metal object M2 and/or M3 on a left or right side of an individual,
  In case of negative response in step 210, step 214 of finding out whether this crossing corresponds to the beginning or the end of crossing of a transverse detection line accompanied by a metal detection,
  If so, step 216 of validating the detection of a metal object M4 on the back of an individual,
  In case of a negative response to step 204 or 214, step 218 of searching for the crossing of an oblique detection line 142D, 143D,
  If so, step 220 of finding out whether this crossing corresponds to the crossing of the oblique detection line by the left side of the individual accompanied by a metal detection,
  If so, step 222 of validating the detection of a metal object M2 on the left side of an individual,
  In case of negative response in step 220, step 224 of searching for an individual who arrives at an intersection between two oblique detection lines accompanied by a metal detection,
  If so, step 226 of validating the detection of a metal object M1 on the front of an individual,
  In case of negative response to step 224, step 228 of finding out whether this crossing corresponds to the crossing of the oblique detection line by the right side of the individual accompanied by a metal detection,
  If so, step 230 of validating the detection of a metal object M3 on the right side of an individual,
  In case of negative response to step 228, step 232 of searching for an individual who leaves an intersection between two oblique detection lines accompanied by a metal detection,
  If so, step 234 of validating the detection of a metal object M4 on the back of an individual, and
  Looping back to step 204 in case of negative response at the end of steps 218 and 232.

The steps illustrated in FIG. 8 may not all be implemented according to the chosen configuration of the transducers.

In addition, the order and chronology of the steps illustrated in FIG. 8 can be modified.

The method in accordance with the present invention can furthermore comprise steps which consist of removing from the superimposed signature Sx of metal objects identified in a step Tx, the signature Sn of at least one metal object clearly identified beforehand, when the analysis determines that the superimposed signature Sx includes the signature Sn, in order to facilitate the individual identification of the signatures of each metal object.

As indicated above, the invention also relates to a particular application of the metal detector 100 described above according to which the metal detector, which forms an inductive field type-detection means, is integrated into a body scanner 10, which forms a microwave field imaging-type detection means.

Figure 9:
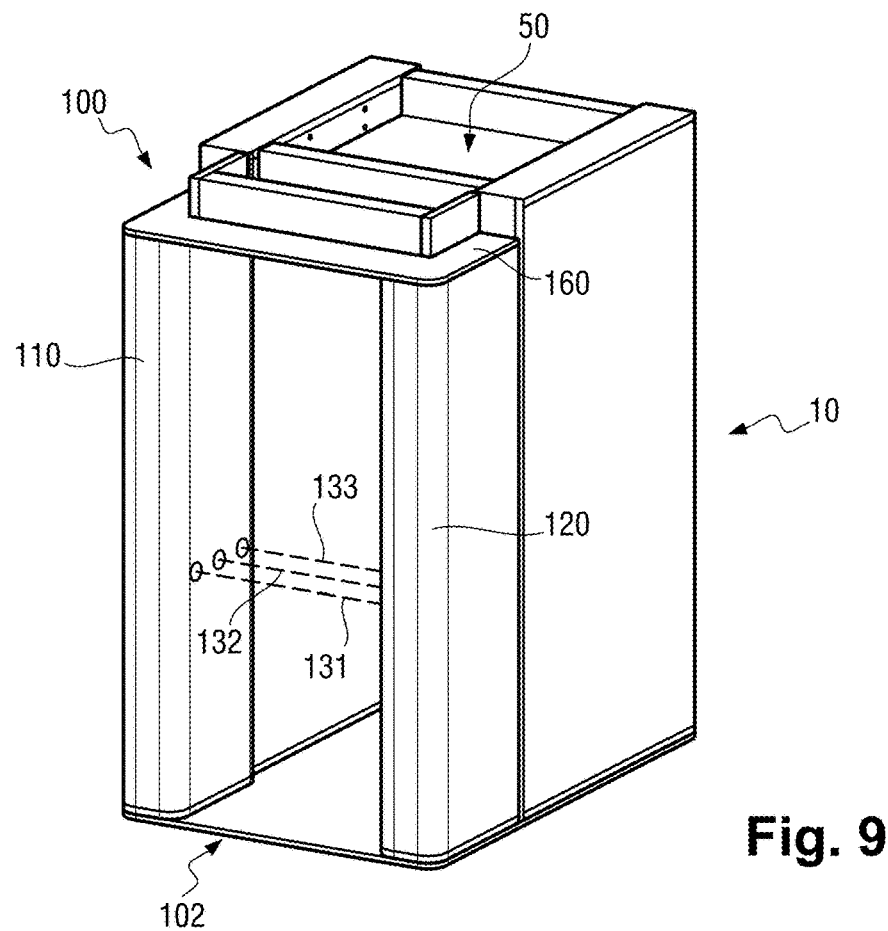

The appended FIG. 9 thus represents a device in accordance with the present invention comprising a body scanner 10 which integrates a metal detector 100.

The body scanner 10 can be the subject of any known embodiments. It will therefore not be described below.

The body scanner 10 proceeds essentially by measuring the microwave energy reflected and/or absorbed based on the properties of the materials examined, in particular based on the dielectric properties and on the magnetic permeability.

By way of non-limiting example, the body scanner 10 may comply with the provisions described in document EP 2 202 700.

The metal detector 100 is preferably placed at the entrance to the body scanner 10. It defines the channel or passageway 102 that any individual must take to reach the body scanner 10.

The modalities of integration of the metal detector 100 into the body scanner 10 can be the subject different of alternatives.

Figure 10A:
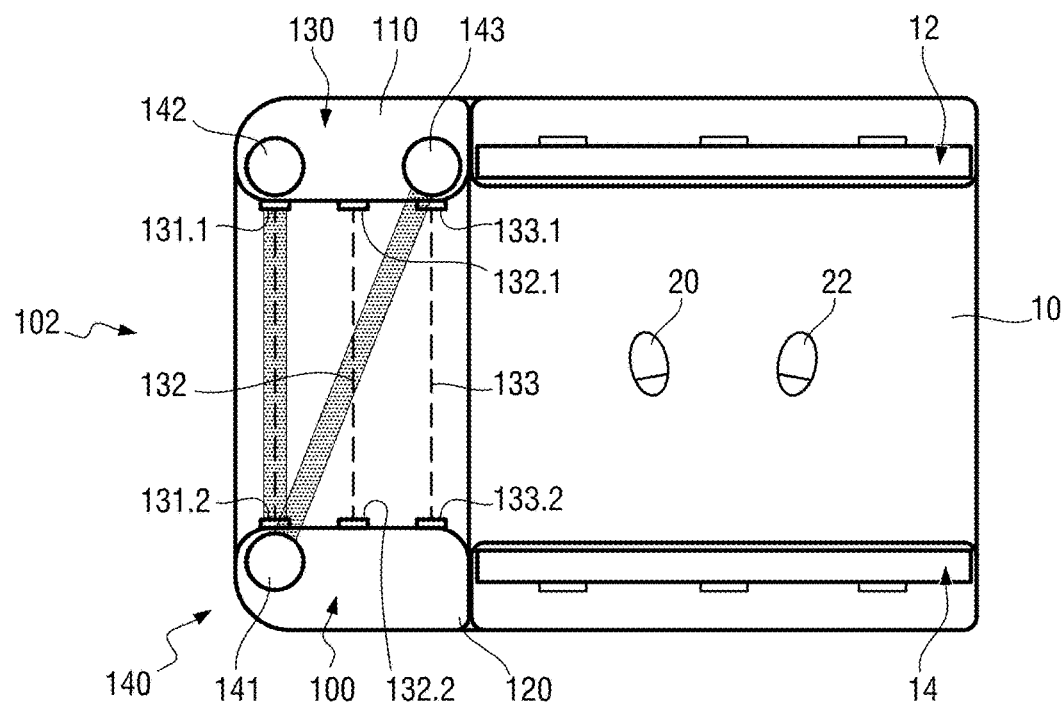

FIG. 10a represents a metal detector 100 of the type represented in FIG. 1a, with three column transducers 141, 142 and 143, disposed upstream of a body scanner 10 comprising a transmitter 12 and a receiver 14 disposed in respectively opposite panels, framing the examination chamber of the body scanner 10.

Figure 10B:
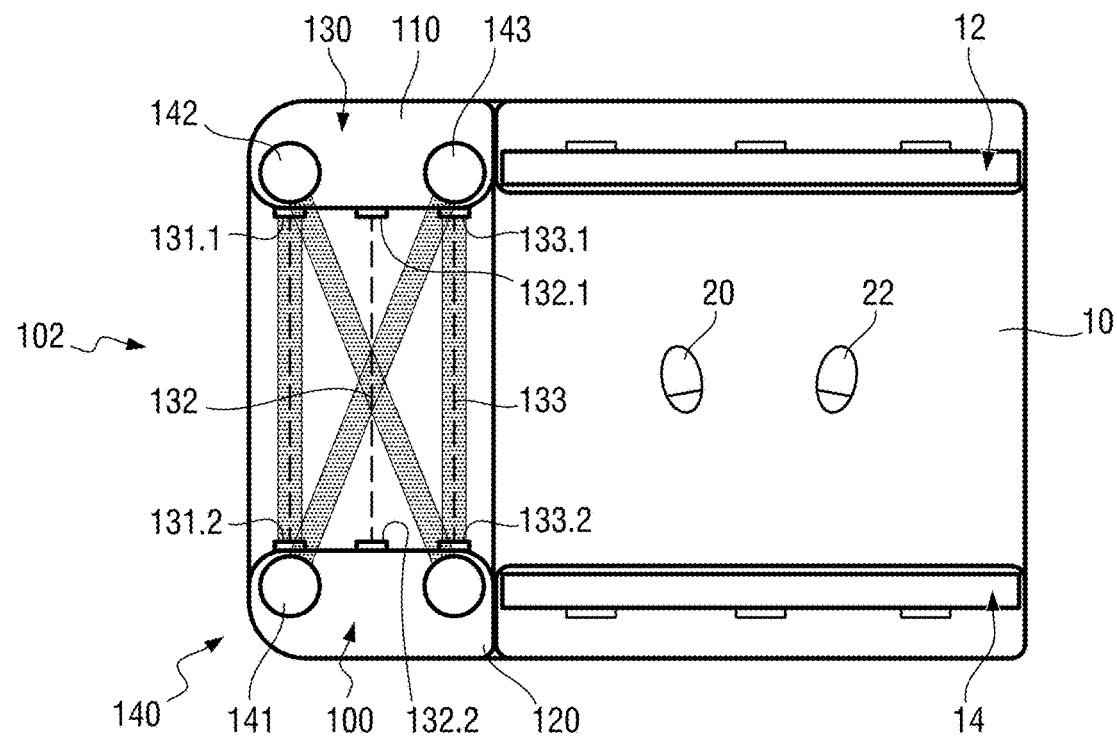

FIG. 10b represents a metal detector 100 of the type represented in FIG. 1b, with four columnar transducers 141, 142, 143 and 144, disposed upstream of a body scanner 10 comprising a transmitter 12 and a receiver 14 disposed in respectively opposite panels, framing the examination chamber of the body scanner 10.

Figure 10C:
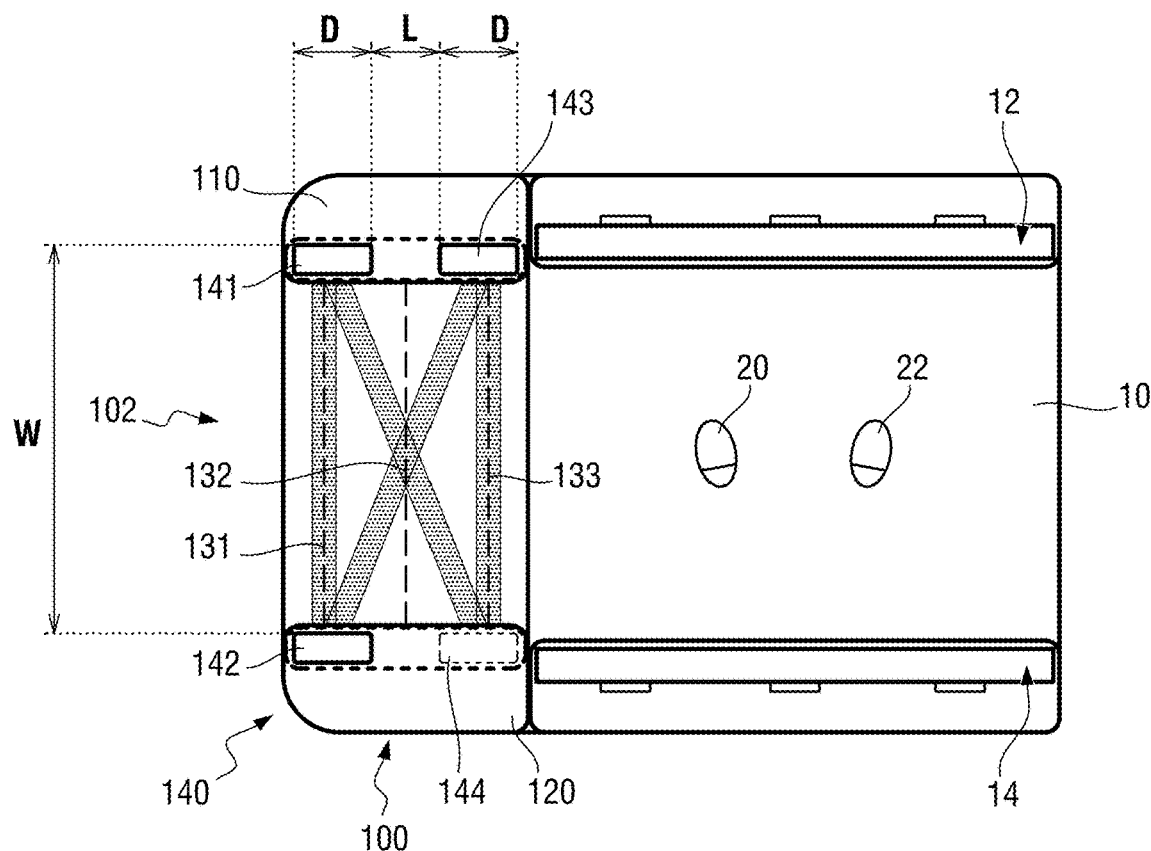

FIG. 10c represents a metal detector 100 of the type represented in FIG. 1bc, with three or four panel-type transducers 141, 142, 143 and 144, disposed upstream of a body scanner 10 comprising a transmitter 12 and a receiver 14 disposed in respectively opposite panels, framing the examination chamber of the body scanner 10.

Figure 10D:
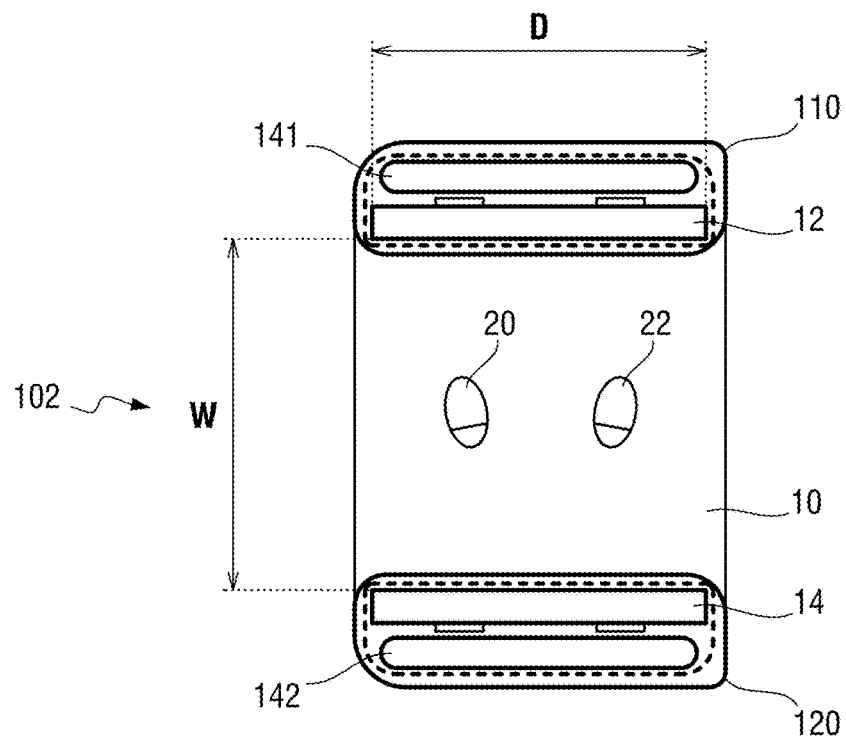

FIG. 10d represents one alternative of the invention according to which the metal detector 100 is not disposed upstream of the body scanner 10, but is co-located with the body scanner 10, that is to say integrated into the panels of the body scanner 10 which house the transmitter 12 and the receiver 14 framing the examination chamber of the body scanner 10. The metal detector 100 thus integrated into the panels of the body scanner 10 may comply with any one of the alternatives illustrated in FIGS. 1a to 1c, that is to say may comprise three or four column or panel transducers.

Figure 10E:
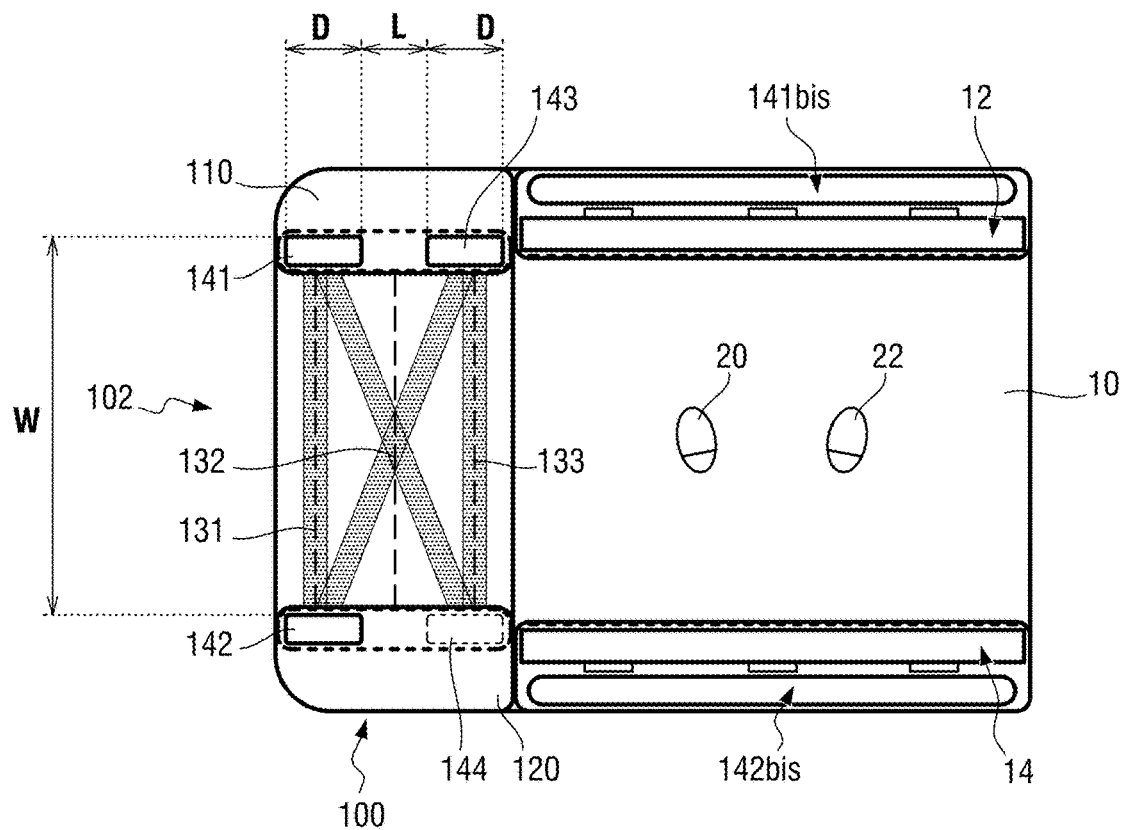

FIG. 10e represents one alternative of the invention according to which there are provided a first metal detector 100 upstream of the body scanner 10 and a second metal detector 100b is co-located with the body scanner 10 that is to say integrated into the panels of the body scanner 10 which house the transmitter 12 and the receiver 14 framing the examination chamber of the body scanner 10. The metal detector 100 disposed upstream of the body scanner 10 may comply with any one of the alternatives illustrated in FIGS. 1a to 1c, that is to say may comprise three or four column or panel transducers. It may alternatively comprise only two transducers 140 disposed respectively on either side of the channel 102, in order to make a detection of presence of a metal object. The metal detector 100b is integrated into the panels of the body scanner 10 can comply with any one of the alternatives illustrated in FIGS. 1a to 1c, that is to say can comprise three or four column or panel transducers.

One embodiment in accordance with the representation of FIG. 10e, according to which metal detection means 140 allowing a 3D detection are co-located with the body scanner 10, but with however additional metal detection means 100 allowing an upstream 1D detection of the body scanner 10 also provided, has the advantage that, with this configuration, it is possible to use the induction upstream 1D metal detector optimized for the discrimination between the presence or absence of metal objects and the control accordingly of the sensitivity of the body scanner 10 to keep to a minimum the number of nuisance alarms and the 3D metal detector co-located with the induction body scanner 10 optimized for the location of the metal objects and thus obtain maximum accuracy in the location of the metal objects.

As indicated previously within the scope of the invention, preferably the result of the inductive-type analysis aimed at the search for a metal object and the result of the microwave-based imaging analysis are displayed on a single screen made available to an operator.

According to one particular embodiment in accordance with the present invention, in case of inductive field detection of one or several targets, the sensitivity of the microwave imaging system 10 is preselected at the "metal & dielectric" level only in the area(s) where the inductive system 100 has determined the presence of metal target(s), while in the other areas the sensitivity of the microwave imaging system 10 is preselected at the "dielectric" level. In the case of use of a 1D inductive system, the aforementioned areas are defined only in height while in the case of use of a 3D inductive system, the areas are defined in height, width and depth.

As indicated in the preamble, the invention also relates to a method for detecting fraudulent objects carried by an individual using the aforementioned device comprising in combination a body scanner 10 and a metal detector 100 integrated into the body scanner. 10. This method comprises in particular the steps of making a detection of metal objects carried by an individual with location in the three-dimensional space on the individual of the metal objects detected using the metal detector 100 and of controlling the body scanner 10 by adapting the sensitivity of the body scanner 10, at least on an area of interest, when the metal detector detects the presence of a metal object.

The invention thus allows focusing an area of interest for analysis by the body scanner 10 on an area containing the metal objects M1, M2, M3 and/or M4 detected by the metal detector 100, by concentrating the analysis carried out by the body scanner 10 on this area of interest.

More specifically within the scope of the invention, the sensitivity of the body scanner 10 forming microwave-based imaging analysis means is placed at a high level when the inductive-type detection means detect the possible presence of a metal target, at least on the area of interest identified by the metal detector, and on the contrary is placed at a lower level when the inductive-type detection means do not detect the possible presence of a metal target.

Thus within the scope of the invention, if the inductive-type analysis means constituted by the metal detector 100 do not detect the potential presence of metal objects, the sensitivity of the microwave-based imaging analysis means constituted by the body scanner 10 can remain relatively low, at an adequate level for the detection of non-metal objects.

The usual high rate of false alarms resulting from the use of the microwave imaging-based analysis means (generally on the order from 65% to 85%) being limited according to the invention to the only cases of detection of a metal object beforehand by the associated inductive-type metal detector (themselves on the order of 10%), the overall rate of false alarms resulting from a body scanner in accordance with the present invention is relatively low. For the remaining 90% of individuals on whom the metal detecting means do not detect a metal object, the body scanner is indeed placed on a low sensitivity level. The overall rate of false alarms resulting from a body scanner in accordance with the present invention thus typically falls within a range comprised between 10 and 20%

Those skilled in the art will understand that the control of the sensitivity of the microwave-based imaging analysis means, by increasing the sensitivity of these microwave-based imaging analysis means forming a body scanner, in the only cases where a metal object has been detected beforehand by the metal detecting means, allows considerably reducing the overall rate of false alarms of the system in accordance with the present invention.

Statistically, it can be considered that the criteria for detecting a metal-type induction alarm occurring in less than 10% of an examined population, at least 90% of the inspected persons will be inspected only for dielectric-type (non-metal) targets by the microwave-based body scanner, with a reduced-sensitivity microwave field, leading to a very significantly reduced overall rate of false alarms.

Figure 11:
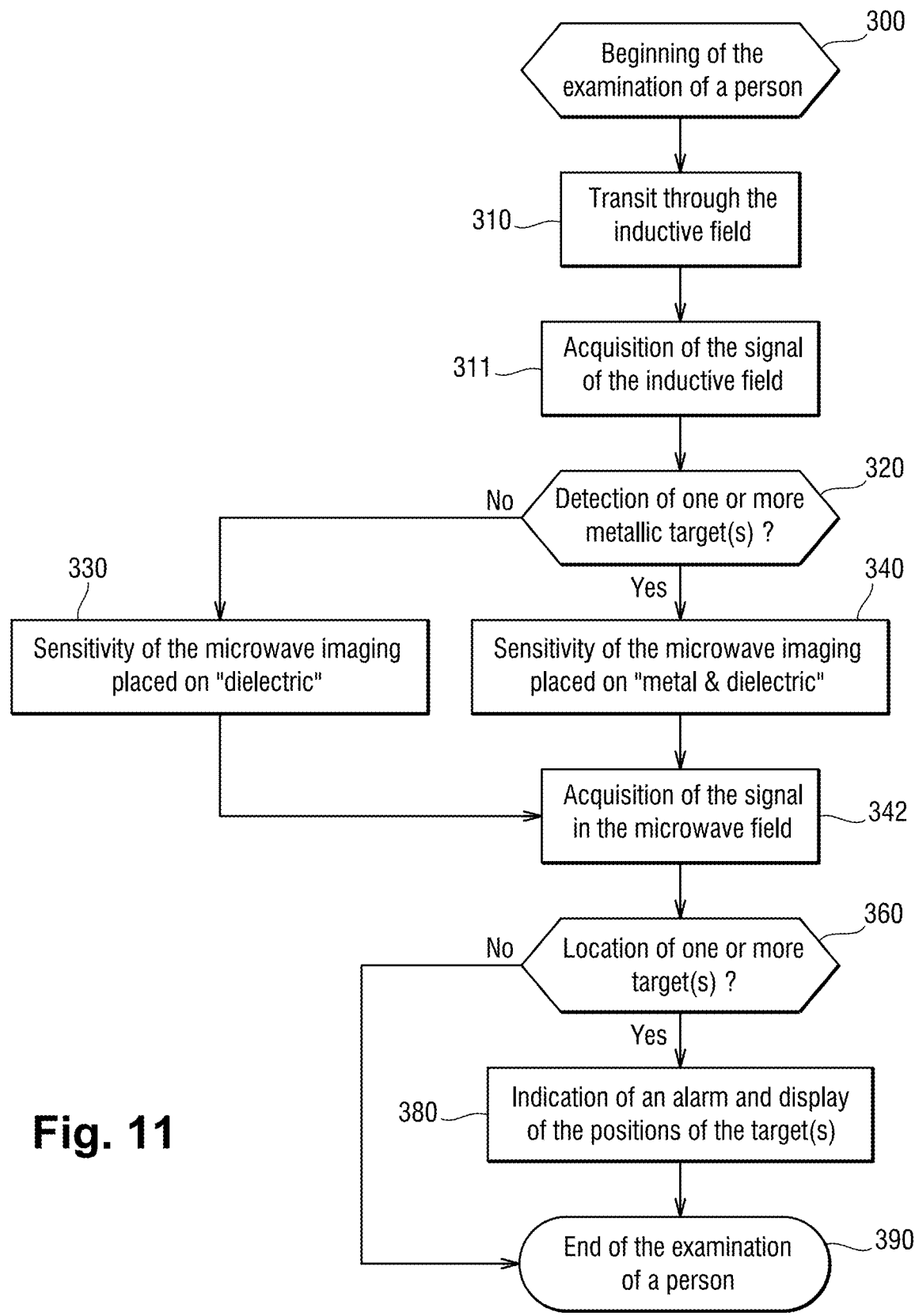
Figure 12:
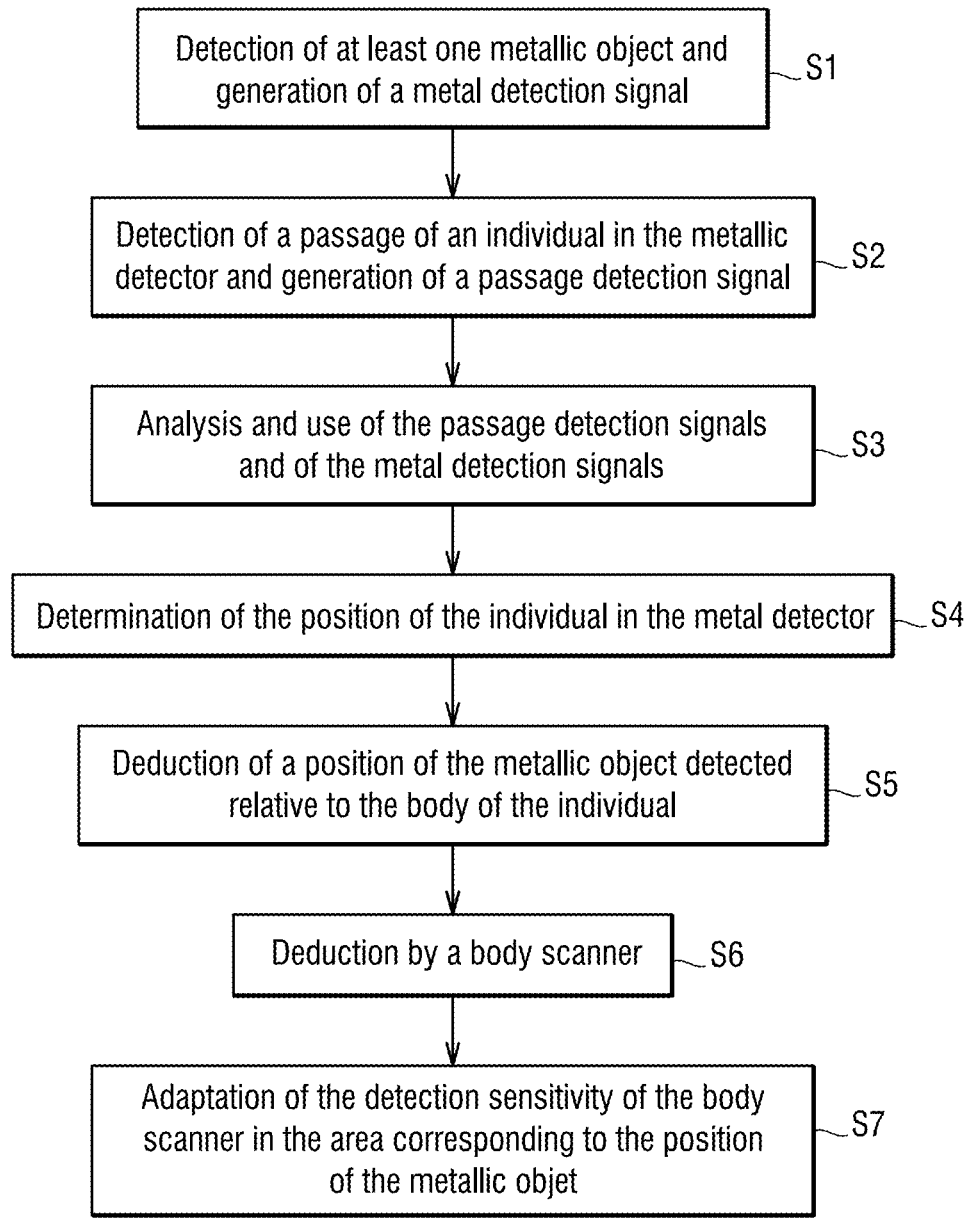
FIG. 12 is a flowchart illustrating steps of a method for detecting fraudulent objects carried by an individual in accordance with one embodiment of the invention.

FIG. 11 shows a flowchart schematizing the main steps of the detection method in accordance with the invention implementing a metal detector 100 integrated into a body scanner 10, which comprises the following successive steps:

step 300: beginning of the examination of a person. At this stage, an individual to be examined is invited to enter the body scanner in accordance with the invention, passing through the metal detector 100, step 310: beginning of the transit of the individual through the inductive field generated by the metal detector 100, more specifically by the coils 140. During this step, the examined individual passes/stops, crosses the inductive field inspection area (it is recalled, as indicated above, that the inductive field-based inspection area can be located upstream of the body scanner 10 strictly speaking as illustrated in FIG. 9 and FIGS. 10a to 10c or cover the area of the body scanner 10 as illustrated in FIGS. 10d and 10e), step 311: acquisition of the signal corresponding to the inductive field, step 320: analysis of the signals coming from the metal detector 100 to find out whether a detection of a metal target has been made or not.

step 330 implemented in case of a negative response to the target detection step 320: the central unit of the system positions the sensitivity of the microwave imaging 10 on a low "dielectric" sensitivity level. The modification of the sensitivity of the microwave imaging 10 is made by modifying microwave image processing parameters by the central unit with a view to determining whether, based on the signals generated by the metal detector 100, instructions to generate an alarm (sound and/or optical alarm) must be sent by the analysis means 50 to a suitable alert device. In the present case, as the metal detector 100 has not detected a metal target, the central unit modifies the microwave image processing parameters so as to carry out an analysis at the body scanner 10 based on an imaging sensitivity in a microwave inspection field which corresponds to a level just necessary to make the detection of dielectric targets, that is to say a sensitivity lower than the one required for a detection of the metal targets. This disposition allows limiting the risk of false alarms.

step 340 implemented in case of a positive response in step 320: the central unit positions the sensitivity of the microwave imaging 10 this time at a higher "metal & dielectric" sensitivity level. Here again, the modification of the sensitivity of the microwave imaging 10 is made by modifying the microwave image processing parameters by the central unit 50. Particularly, this modification of the sensitivity allows detecting both metal targets and dielectric targets. Although more rigorous and likely to generate a level of false alarms, this disposition is required due to the fact that the metal detector 100 has detected the potential upstream metal presence (this occurs in only 10% of cases, although intrinsically leading to a risk of high rate of false alarms, does not induce a substantial overall rate of risks of false alarms).

step 342: acquisition of the signal from the detection means in the microwave field 10. During this step, the inspected individual is scanned by the microwave inspection field 10. The relevant data coming from the detection means are collected and analyzed.

step 360: during this step, the central unit analyzes the signals coming from the microwave detection means 10 and finds out whether they correspond to the location of a target. For that, the analysis means 50 perform a processing of the microwave image taking into account the sensitivity of the microwave imaging determined in step 330 or in step 340, depending on the response in step 320.

It will be understood that, in one alternative, the step 340 of modification of the sensitivity can alternatively be simultaneous or subsequent to the acquisition step 342, the modification of the sensitivity corresponding to a modification of the microwave image processing parameters.

step 380 implemented in case of a positive response in step 360: indication of an alarm and display of the position of the targets on the microwave image generated by the central unit 50. The display of the alarm is made available to an operator, typically on a screen with display of the position of the detected targets. It will be observed that step 380 is omitted on the assumption that step 360 does not detect a target.

step 390: end of the examination of an individual.

In one embodiment, during step 340, the central unit 50 can be configured to modify the sensitivity of the microwave imaging only in the area of the microwave image in which the metal detector 100 has detected a metal target, the sensitivity remaining unchanged in the other areas of the microwave image. In other words, the central unit 50 modifies this sensitivity only in a portion of the microwave image which is obtained from the signals coming from the microwave detection means 10, said portion corresponding to the area in which the metal detector has made a detection of a metal target.

In FIG. 10, the presence of markings on the ground 20, 22, substantially in the center of the space forming a body scanner 10 will be noted. These markings 20, 22 preferably correspond to the contour of shoe sole prints. These markings 20, 22 are intended to receive the feet of an individual during his examination by the body scanner 10. These markings 20, 22 allow guaranteeing a precise positioning of the examined individual relative to a microwave transmitting/receiving means 12 and a microwave receiving/transmitting means 14 placed opposite each other, respectively on either side of the thus formed passageway in the body scanner 10, in the extension of the upstream passageway 102 formed by the metal detector 100.

Although this is not represented in the appended figures, the metal detector 100 can also be provided on the ground with a central line or an equivalent means delimiting the preferred path of the individual during his movement in the metal detector 100 in order to guarantee a precise positioning of the individual relative to the side panels 110, 120 and consequently relative to the detection means 140.

The body scanner 10 can be a pass-through scanner. In this case, after having been examined in the body scanner 10, the examined individual exits the body scanner 10 through its end opposite the entrance through which he entered the metal detector 100.

The body scanner 10 can also be closed on its end opposite to the entrance in the metal detector 100. In this case, after having been examined in the body scanner 10, the examined individual exits the body scanner 10 by passing through the metal detector again 100.

Of course, the present invention is not limited to the embodiments described above but extends to any alternative in accordance with its spirit.

As indicated above, the passage detection barriers 130 can be formed of any technology other than the optical technology.

The detection of the advance of an individual and of his positioning in the passageway 102 can be made for example using at least one correctly placed camera, allowing detecting, for example by pixel analysis, the successive passage of an individual by a plurality of fictitious barriers corresponding to the location of the barriers described in the preceding description.

Likewise, the metal detector 100 placed upstream of the body scanner 10 in accordance with the present invention can be equipped with a Doppler-type system or the same allowing knowing the spot and movement of an individual in the passageway 102.

The system in accordance with the invention comprises a central unit which analyzes on the one hand the signals coming from the passage detection barriers 130 and on the other hand the signals coming from the transducers 140.

The central unit uses the signals coming from the passage detection barriers 130 to define the position of the individual in the metal detector 100 and relative to the transducers 140. Knowing the position of the individual relative to the transducers 140, the central unit can determine, when the transducers 140 detect a metal object, on which part of the body said metal object is placed.

It will be noted that within the scope of the invention, the disposition of the transducers 141, 142, 143, 144 and the cooperation defined therebetween by the control of their configuration in transmitting mode or in receiving mode, generates main detection lines between two transmitting and receiving transducers respectively, which are for some transverse to the direction of movement in the metal detector 100 and for the others inclined obliquely or diagonally relative to this direction of movement in the metal detector 100.

Furthermore, it will be understood upon reading the preceding description and upon examining the appended figures, that the transverse detection lines allow primarily detecting metal objects carried by an individual on the front and on the back of his body insofar as the front and the back of the individual's body reaches firstly and respectively leaves lastly these lines, while the oblique detection lines allow primarily detecting metal objects carried by an individual on his left side or on his right side insofar as the sides of the individual successively cross these lines.

The combination of the metal detector 100 and of the body scanner 10 in accordance with the invention allows in particular guaranteeing reliable detection of metal objects over the entire body of an individual, including at the level of the feet, thanks to the focusing of the analysis by the body scanner 10 resulting from the first research made by the metal detector 100.

The implantation of the metal detecting transducers 141, 142, 143 and 144 can be the subject of many embodiments.

As indicated above, the detectors located on the same side of the passageway 102, that is to say the detectors 141 and 144 on the one hand and 142 and 143 on the other hand, are preferably located respectively in the side panels 110, 120. They can be placed on a common side support or on respective supports.

Alternatively, the detectors 141, 144 and 142, 143 can be placed in respective columns.

In practice, the operator can have on a single screen the display of the result of the inductive-type analysis aimed at the search for a metal object and the imaging resulting from the microwave-based analysis.

The invention claimed is:

1. A metal detector configured to detect a metal object and comprising:
   a first and a second panels defining a passage therebetween;
   transducers comprising two transducers placed in the first panel and being spaced longitudinally along a direction of displacement of an individual within the passage and one transducer disposed in the second panel, so that the transducers are configured to spatially discriminate a location of the metal object;
   two passage detection barriers configured to generate a detection signal when an individual passes through the metal detector; and
   a central unit configured to analyze the signals from at least one of the passage detection barrier and signals from the transducers, to determine a position of the individual in the metal detector relative to the transducers at the time when at least one of the transducers generates a signal indicative of detection of a metal object and to deduce therefrom a location of the metal object relative to a body of the individual.

2. The metal detector of claim 1, wherein the transducers comprise at least one of the following elements:
   a transmitter housed in the first panel and two receivers housed in the second panel;
   two transmitters housed in the first panel and a receiver housed in the second panel;
   two transducers housed in the first panel and two transducers housed in the second panel; and
   three transducers each being adapted to work alternately as a transmitter and a receiver.

3. The metal detector of claim 1, wherein the central unit is configured to discriminate a location of the metal object in a first direction of the passage which is transverse to the direction of displacement, and in a second direction, which is parallel to the direction of displacement.

4. The metal detector of claim 1, wherein each transducer comprises at least one coil.

5. The metal detector of claim 1, wherein the passage detection barriers comprise optical barriers.

6. The metal detector of claim 1, wherein the metal detector comprises three passage detection barriers distributed longitudinally along the passage in the metal detector and associated with the transducers to determine a position of an individual in the passage relative to the transducers.

7. The metal detector of claim 1, wherein the passage detection barriers comprise detectors placed in the first and second panels.

8. The metal detector of claim 1, wherein at least one of the passage detection barriers longitudinally coincides with a pair of transducers.

9. The metal detector of claim 1, wherein at least one of the passage detection barriers longitudinally coincides with a center of an oblique detection line connecting respectively two of the transducers.

10. The metal detector of claim 1, wherein the transducers cooperate in groups of three.

11. The metal detector of claim 10, wherein, within each group of three transducers, one of the transducers operates as a transmitter or a receiver and two of the transducers operate as a receiver or a transmitter, respectively.

12. The metal detector of claim 1, wherein two of the transducers are placed opposite each other, on either side of the passage, respectively in the first and second panels, at a same longitudinal level in the direction of displacement, a third transducer being offset downstream with reference to the direction of displacement relative to the two of the transducers, at least one of the passage detection barriers being located at a same longitudinal level as the two of the transducers.

13. The metal detector of claim 1, wherein the transducers comprise an additional transducer, wherein one of the passage detection barriers is located at the level of two transducers which are placed opposite each other on either side of the passage and a second of the passage detection barriers is located at a point of intersection between two oblique detection lines connecting two of the transducers which are on either side of the passage but are not opposite each other.

14. The metal detector of claim 1, wherein the transducers are positioned so as to define two detection lines having an angle comprised between 15° and 60°.

15. A detection system comprising the metal detector of claim 1 and a body scanner comprising microwave detection means configured to generate a microwave image, the metal detector being positioned upstream of the body scanner relative to the direction of displacement.

16. The system of claim 15, wherein the central unit is configured to increase a sensitivity of the microwave detection means when the metal detector identifies a metal object and to determine a location of the metal object relative to a body of an individual, such that the sensitivity is greater in an area of interest corresponding to the location of the metal object in the microwave image than in other areas of the microwave image.

17. The metal detector of claim 1, wherein the transducers are positioned so as to define two detection lines having an angle comprised between 30° and 45°.

18. A detection method comprising the following steps:
S1: detection of a metal object carried by an individual passing through a metal detector and generation of a metal detection signal;
S2: detection of a passage of the individual through the metal detector and generation of a passage detection signal;
S3: analysis of the passage detection signal and the metal detection signal;
S4: determination of the location of the individual in the metal detector relative to transducers of the metal detector at the time the metal detection signal is generated; and
S5: deduction of a location of the metal object relative to a body of the individual.

19. The detection method of claim 18, further comprising the following steps:
S6: generation of a microwave image of the individual; and
S7: after step S5, increase of a sensitivity of the body scanner such that the sensitivity is greater in an area of interest corresponding to the location of the metal object in the microwave image than in other areas of the microwave image.

20. A detection system configured to detect a metal object carried by an individual, comprising:
a metal detector comprising:
a first and a second panels defining a passage therebetween; and
three inductive transducers housed in the first and second panels and being disposed on either side of the passage, two of the inductive transducers being placed in the first panel and being spaced longitudinally in a direction of displacement of the individual in the passage, while the third inductive transducer is disposed on the opposite side of the passage in the second panel, so that the inductive transducers are configured to spatially discriminate the location of the metal object;
three passage detection barriers being spaced longitudinally along the passage and configured to generate a detection signal when the individual passes through the metal detector; and
a central unit configured to analyze the signals from at least one of the passage detection barriers and signals from the three inductive transducers, to determine the position of the individual in the metal detector relative to the inductive transducers at the time when at least one of the inductive transducers generates a signal indicative of a detection of a metal object and to deduce therefrom a position of the metal object relative to a body of the individual.

* * * * *